US008612612B1

(12) United States Patent
Dukes et al.

(10) Patent No.: US 8,612,612 B1
(45) Date of Patent: Dec. 17, 2013

(54) DYNAMIC POLICY CONTROL FOR APPLICATION FLOW PROCESSING IN A NETWORK DEVICE

(75) Inventors: Mohini Dukes, Chelmsford, MA (US); Chandra Pandey, Lunenburg, MA (US); Vijay Kamisetty, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 124 days.

(21) Appl. No.: 13/247,499

(22) Filed: Sep. 28, 2011

(51) Int. Cl.
*G06F 15/16* (2006.01)
*H04L 29/08* (2006.01)

(52) U.S. Cl.
CPC .............. *H04L 67/14* (2013.01); *H04L 67/141* (2013.01)
USPC ........... 709/228; 709/203; 709/223; 709/224; 709/229; 370/230

(58) Field of Classification Search
USPC ......... 709/203, 217, 223, 224, 229, 225, 235; 370/230
See application file for complete search history.

(56) References Cited

U.S. PATENT DOCUMENTS

| 7,769,875 | B1 * | 8/2010 | Moisand et al. | 709/229 |
|---|---|---|---|---|
| 8,325,638 | B2 * | 12/2012 | Jin et al. | 370/310 |
| 2008/0044181 | A1 | 2/2008 | Sindhu | |
| 2010/0095367 | A1 * | 4/2010 | Narayanaswamy | 726/12 |
| 2010/0142373 | A1 * | 6/2010 | Jin et al. | 370/328 |

OTHER PUBLICATIONS

U.S. Appl. No. 12/905,771, filed Oct. 15, 2010 entitled Collectively Addressing Wireless Devices.

"3GPP TS 23.401—General Packet Radio Service (GPRS) enhancements for Evolved Universal Terrestrial Radio Access Network," Section 4.3.8.1, version 10.0.0, 3rd Generation Partnership Project, Technical Specification Group Services and System Aspects, Jun. 2010, 4 pgs.

"3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, Jun. 2010, 183 pgs.

U.S. Appl. No. 12/182,619, filed Jul. 30, 2008 entitled Streamlined Packet Forwarding Using Dynamic Filters for Routing and Security in a Shared Forwarding Plane.

U.S. Appl. No. 13/172,505, filed Jun. 29, 2011 entitled Variable-Based Forwarding Path Construction for Packet Processing Within a Network Device.

* cited by examiner

*Primary Examiner* — Ramy Mohamed Osman
(74) *Attorney, Agent, or Firm* — Shumaker & Sieffert, P.A.

(57) ABSTRACT

In one example, a method includes receiving, with a network device, a portion of a subscriber session packet flow for a subscriber session, and reassembling application-layer data from data packets in the subscriber session packet flow into one or more application flows for the subscriber session. The method includes identifying, from the application flows, application identity information for the application flows, and applying a first session policy to the subscriber session. Applying the first session policy includes applying one or more application policies to the application flows in the subscriber session based on subscriber information and the application identity information for the application flows. The method includes processing the application flows in the subscriber session for accessing a packet data network in accordance with the application policies.

26 Claims, 6 Drawing Sheets

DYNAMIC POLICY CONTROL FOR APPLICATION FLOW PROCESSING IN A NETWORK DEVICE

TECHNICAL FIELD

The invention relates to packet-based data networks and, more particularly, to managing packet forwarding within data networks.

BACKGROUND

Various types of services and access networks, including fixed subscriber connections such as digital subscriber line- or cable-based connections, and mobile connections such as cellular radio access networks, are used to access internet protocol (IP)-based packet data networks such as the Internet, enterprise intranets, and virtual private networks (VPNs). Wireless devices, such as cellular or mobile smart phones and feature phones, tablet computers, and laptop computers, may initiate or otherwise transmit a signal at the designated frequency to the base station to initiate a call or data session and begin transmitting data. As another example, a network service provider offers services to subscribers that access a service provider core network using an access network.

The service provider network may support multiple types of access network infrastructures that connect to service provider network access gateways to provide access to the offered services. Access gateways are positioned near the edge of the service provider network upstream from the subscribers and provide access for the subscriber connections (such as digital subscriber line- or cable-based connections) into the service provider network. The access gateways typically provide mechanisms for identifying subscriber traffic and providing subscriber-specific services. The access gateways apply subscriber policies to manage subscriber traffic on a per-subscriber basis as such traffic traverses the service provider core network boundary.

SUMMARY

In general, this disclosure describes techniques for dynamically identifying a set of one or more application flows of a subscriber data flow for a subscriber session that is serviced by a network device, and responsively determining and applying application flow-specific policies for the subscriber to the set of identified application flows. An integrated policy control function for the network device performs, in real-time, fine-grained policy updates at the application flow level, enabling prioritization within a distributed service or control plane among different application flows for a single subscriber and among different application flows for multiple subscribers.

In one example a services module of a network device performs deep packet inspection of incoming application flows to reassemble application-layer data from data packets in the subscriber session packet flow into one or more application flows for the subscriber session, and to identify newly added or terminated application flows for a subscriber session received (or previously received) with the network device data plane. A policy control engine of the services module dynamically updates session policies applied for the subscriber session based on the identified application flows and a subscriber profile. Such policies may include rate limiting, application flow prioritization, and offloading to other network devices, including other such devices that participate in a unified control/services plane with the network device. The services module continually monitors, using deep packet inspection, the individual application flows in the subscriber session and notifies the policy control engine if a new application flow is activated or if one of the application flows is deactivated. The policy control engine applies updates to the subscriber session policies based on identified changes to the application flows.

In some examples, a central policy coordinator of the network devices receives and stores policy and session information from policy control engines of one or more services modules of the network device to provide a centralized repository of such information that may be redistributed to the services modules to facilitate high availability. For instance, if the application flows for a subscriber session ends up being routed through another services module during the session (due, e.g., to congestion or failure of the initial services module for the packet flow), the policy control engine of the other services module can still retrieve the up-to-date policy and session information from the central policy coordinator. Any of several services modules can thereby take over processing of ongoing application flows for the session while leveraging the previously established session policies. The new services module can in turn continue monitoring the session for new changes in the constituent application flows, continue updating the session policies in response to such changes, and continue updating the central policy coordinator with such changes. A single subscriber session may therefore continue to be handled from beginning to end with ongoing session policy updates based on individual application flows in a high-availability environment that provides seamless transitioning of application flow processing among multiple services modules.

Any of a variety of gateways and other network devices in a network may therefore include services modules with policy control engines configured for applying a granular, dynamic, and virtualized session policy control for subscriber sessions in accordance with the techniques disclosed herein. That is, the policy control is granular because it is based on an inspection of each individual application flows for associated subscriber sessions rather than upon an agglomeration of subscriber data traffic; it is dynamic because it includes ongoing policy updates based on changes to the application flows during subscriber sessions; and it is virtualized because service modules send session policies to a central policy coordinator that makes the continually updated policies available to any other services module that may subsequently assume control of the session.

In one example, a method includes receiving, with a network device, a portion of a subscriber session packet flow for a subscriber session. The method further includes reassembling application-layer data from data packets in the subscriber session packet flow into one or more application flows for the subscriber session. The method further includes identifying, from the one or more application flows, application identity information for the one or more application flows. The method further includes applying a first session policy to the subscriber session, wherein applying the first session policy comprises applying one or more application policies to the one or more application flows in the subscriber session based on subscriber information and the application identity information for the one or more application flows. The method further includes processing the one or more application flows in the subscriber session for accessing a packet data network in accordance with the one or more application policies.

In another example, a network device includes a first services module and a routing engine that includes a policy coordinator component. The first services module includes a deep packet inspection component, a policy control engine with a communicative connection with the routing engine, and a master subscriber session table. The deep packet inspection component is configured to receive a portion of a subscriber session packet flow for a subscriber session; reassemble application-layer data from data packets in the subscriber session packet flow into one or more application flows for the subscriber session; notify the policy control engine of subscriber information and application identity information for the one or more application flows; and notify the policy control engine of a deactivation of one of the application flows or an activation of a new application flow in the subscriber session. The policy control engine is configured to: apply a first session policy, comprising an application policy for the one or more application flows, to the subscriber session based at least in part on the subscriber information and the application identity information for the one or more application flows; provide the first session policy to the master subscriber session table and to the policy coordinator component; apply an updated session policy to the subscriber session based at least in part on the deactivation of one of the application flows or the activation of the new application flow; and provide the updated session policy to the master subscriber session table and to the policy coordinator component. The first services module is configured to provide the first session policy and the updated session policy from the master subscriber session table to a forwarding unit configured to process at least a portion of the subscriber session packet flow for accessing a packet data network in accordance with the one or more application policies in the first session policy or the updated session policy.

In another example, a non-transitory computer-readable medium includes computer-executable instructions. The instructions cause one or more programmable processors to receive at least a portion of a subscriber session packet flow for a subscriber session with a services module of a network device of a service provider network. The instructions further cause one or more programmable processors to reassemble application-layer data from data packets in the subscriber session packet flow into one or more application flows for the subscriber session. The instructions further cause one or more programmable processors to identify, from the one or more application flows, application identity information for the one or more application flows. The instructions further cause one or more programmable processors to apply a first session policy to the subscriber session, wherein the first session policy comprises one or more application policies for each of the one or more application flows based at least in part on subscriber information and the application identity information for the one or more application flows. The instructions further cause one or more programmable processors to provide the first session policy to one or more forwarding units for processing the one or more application flows for accessing a packet data network in accordance with the one or more application policies in the first session policy. The instructions further cause one or more programmable processors to provide the first session policy to one of the forwarding units and to a policy coordinator that has a communicative connection with one or more additional services modules. The instructions further cause one or more programmable processors to monitor the subscriber session to identify deactivation of one of the application flows or activation of a new application flow. The instructions further cause one or more programmable processors to apply an updated session policy to the subscriber session based at least in part on the deactivation of one of the application flows or the activation of the new application flow. The instructions further cause one or more programmable processors to provide the updated session policy to the one or more forwarding units for processing the application flows in the subscriber session packet flow in accordance with the updated session policy. The instructions further cause one or more programmable processors to provide the updated session policy to the policy coordinator.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
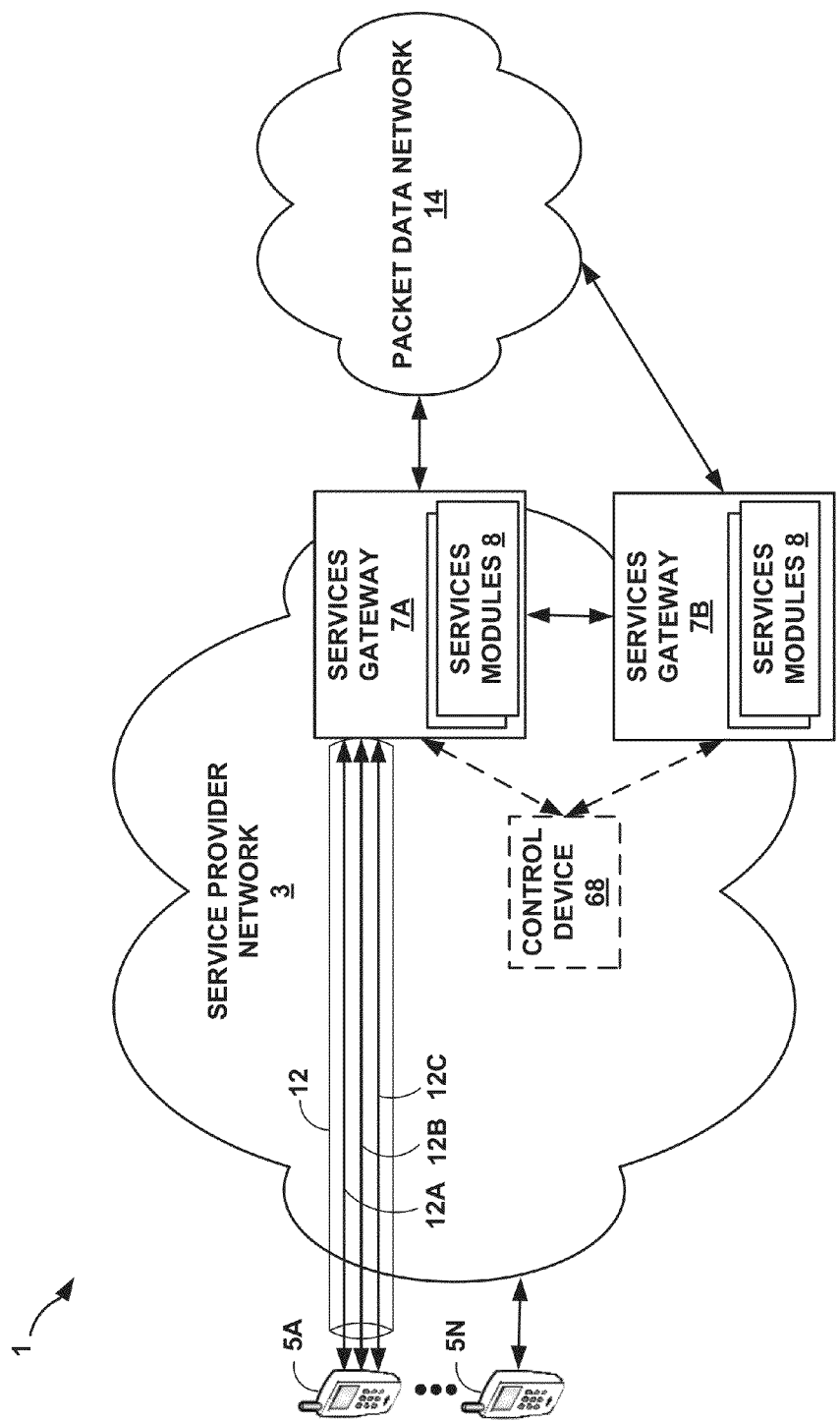
FIG. 1 is a block diagram illustrating an example network system in which a service provider network includes services gateways that dynamically apply subscriber policies on a per-application flow basis in accordance with techniques described herein.

FIG. 1 is a block diagram illustrating an example network system 1 that dynamically applies subscriber policies on a per-application flow basis in accordance with techniques described herein. Network system 1 includes a service provider network 3 having services gateways 7A, 7B ("services gateways 7"), which are representative of any number of services gateways that may be used. Services gateways 7 may be implemented as dedicated services gateways, edge routers, border gateways, mobile broadband gateways, integrated multi-service gateways, or other network appliances in different embodiments. These services gateways 7 process session data flows from subscriber devices 5A-5N ("subscriber devices 5"), such as mobile phones as depicted here, for accessing a packet data network (PDN) 14. Subscriber device 5A or other endpoint devices may run one or more applications, such as Internet browsers, email applications, VoIP clients, video games, videoconferencing applications, and VPN clients, among others. Subscriber device 5A is depicted establishing a communicative connection 12 with services gateway 7A for carrying a subscriber session packet flow that includes representative application flows 12A, 12B, 12C for applications running on subscriber device 5A to access packet data network 14. The subscriber session packet flow carried by communicative connection 12 includes data packets that each contain control, addressing, and other header information, for each layer of the Open Systems Interconnection (OSI) and/or Transport Control Protocol/Internet Protocol (TCP/IP) model as needed, that encapsulate application flow data for one of the individual application flows 12A, 12B, 12C, each of which carries data for a different application running on subscriber device 5A and accessing packet data network 14. While three application flows are depicted in FIG. 1, the subscriber session may carry any number of one or more application flows, in addition to control, addressing, and other header information. Services gateways 7 include respective services modules 8 that include policy control engines that provide updated session policy control for data communication sessions between subscriber devices 5 and packet data network 14. Service provider network 3 may also include control device 68 that may provide a decentralized or virtual control plane, separate from services gateways 7, for decentralized handling of subscriber sessions and session policies. The policy control engines of services gateways 7 and the control device 68 are further described with reference to FIG. 3 below. Any of a variety of gateways and other network devices in service provider network 3 may include services modules with policy control engines configured for applying a granular, dynamic, and virtualized session policy control for subscriber sessions. While subscriber device 5A has communicative connection 12 with services gateway 7A in FIG. 1, service provider network may re-route the communicative connection 12 to another services gateway 7B if, for example, network congestion interrupts the connection with services gateway 7A.

Service provider network 3 provides access to services offered by PDN 14 to subscriber devices 5 and may include one or more access networks, one or more backhaul networks, and one or more core networks, for example. Subscriber devices 5 are representative examples of a wide variety of endpoint devices that may connect with service provider network 3. A subscriber may represent, for instance, an enterprise, a residential subscriber, or a mobile subscriber. Subscriber devices 5 may include smartphones and other mobile phones, desktop computers, laptop computers, tablet computers, 3G or 4G wireless cards, electronic book readers, gaming consoles, video-conferencing suites, workstations, network-ready appliances, file servers, print servers, digital subscriber line (DSL) routers, cable modems, or other devices. A mobile phone may be referred to as User Equipment or UE in a network architecture context. In some architectures, a backhaul network may be used to carry data from an access network to a core network. Certain applications running on subscriber devices 5 may require access to services offered by packet data network 14. The core network may provide access to packet data network 14, which may be the Internet, an enterprise intranet, or a virtual private network (VPN), for example.

Different networks or components included in service provider network 3 may include any of a variety of communication architectures, standards, and protocols. Some elements of service provider network 3 may be used for receiving and terminating subscriber-specific connections so as to produce packet-based communications. Subscriber devices 5 or other subscriber devices connect to an access network of service provider network 3 via access links that may each comprise wired and/or wireless communication links. The term "communication link," as used herein, comprises any form of transport medium, wired or wireless, and can include intermediate nodes such as network devices. Each of the access links may include, for instance, aspects of an asymmetric DSL network, WiMAX, a T-1 line, an Integrated Service Digital Network (ISDN), or wired Ethernet.

In some implementations, services gateways 7 may each be a router that executes routing protocols to identify routes through service provider network 3 or packet data network 14 to various destinations. While described herein with respect to one or more particular architectures for ease of illustration purposes, service provider network 3 may implement any architecture including those set forth by any standards body and those proprietarily owned. Services gateways 7 and other elements of service provider network 3 may, therefore, each represent an abstraction of devices found within many types of network architecture.

Services gateways 7 dynamically identify the application flows 12A-12C of the subscriber session packet flow carried over communicative connection 12 for a subscriber session for subscriber device 5A, and responsively determine and apply application flow-specific policies to the set of identified application flows 12A-12C. An integrated policy control function for the network device performs, in real-time, fine-grained policy updates at the application flow level, enabling prioritization within a distributed service or control plane among different application flows 12A-12C for a single subscriber device 5A and among different application flows for multiple subscriber devices 5.

Each of services modules 8 of services gateway 7A may perform deep packet inspection of incoming application flows to identify newly added or terminated application flows for the subscriber session carried over the communicative connection 12. The policy control engine of the services module dynamically updates session policies applied for the subscriber session based on the identified application flows and a subscriber profile. Such policies may include rate limiting, application flow prioritization, and offloading to other network devices, including other such devices that participate in a unified control/services plane with the network device. The services module continually monitors, using deep packet inspection, the individual application flows in the subscriber session and notifies the policy control engine if a new application flow is activated or if one of the application flows is deactivated. The policy control engine applies updates to the subscriber session policies based on identified changes to the application flows.

In some examples, a central policy coordinator of the services gateways 7 receives and stores policy and session information from policy control engines of one or more services modules of the services gateways 7 to provide a centralized repository of such information that may be redistributed to the services modules to facilitate high availability. The central policy coordinator may reside on the routing engines of any of services gateways 7 or control device 68. For instance, if the application flows for a subscriber session are routed through another services module 9 during the session (due, e.g., to congestion or failure of the initial services module for the subscriber session packet flow), the policy control engine of the other services module can still retrieve the up-to-date policy and session information from the central policy coordinator. Any of several services modules 8 can thereby take over processing of ongoing application flows for the session while leveraging the previously established session policies. The new services module 9 can in turn continue monitoring the session for new changes in the constituent application flows, continue updating the session policies in response to such changes, and continue updating the central policy coordinator with such changes. A single subscriber session may therefore continue to be handled from beginning to end with ongoing session policy updates based on individual application flows in a high-availability environment that provides seamless transitioning of application flow processing among multiple services modules.

Services gateways 7 and other network devices such as control device 68 may therefore include services modules with policy control engines configured for applying a granular, dynamic, and virtualized session policy control for subscriber sessions in accordance with the techniques disclosed herein. That is, the policy control is fine-grained because it is based on an inspection of each individual application flows for associated subscriber sessions rather than upon an agglomeration of subscriber data traffic; it is dynamic because it includes ongoing policy updates based on changes to the application flows during subscriber sessions; and it is virtualized because service modules send session policies to a central policy coordinator that makes the continually updated policies available to any other services module that may subsequently assume control of the session. Service provider network 3 comprising services gateways 7 may therefore provide network services in a highly efficient and robust manner.

Figure 2:
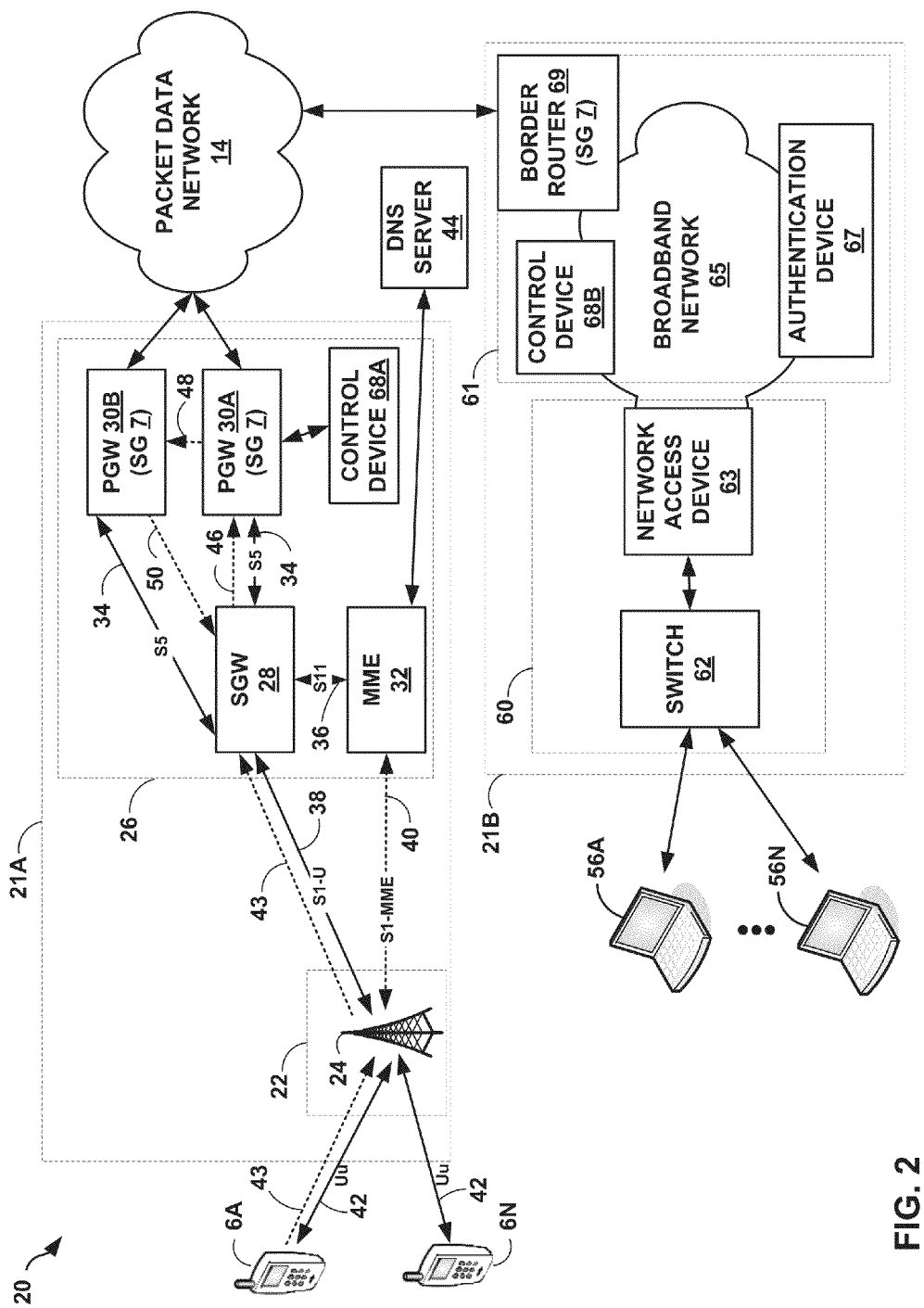
FIG. 2 is a block diagram illustrating a more detailed example network system in which a service provider network includes services gateways that process session data flows from subscriber devices for accessing a packet data network using techniques described in this disclosure.
Figure 3:
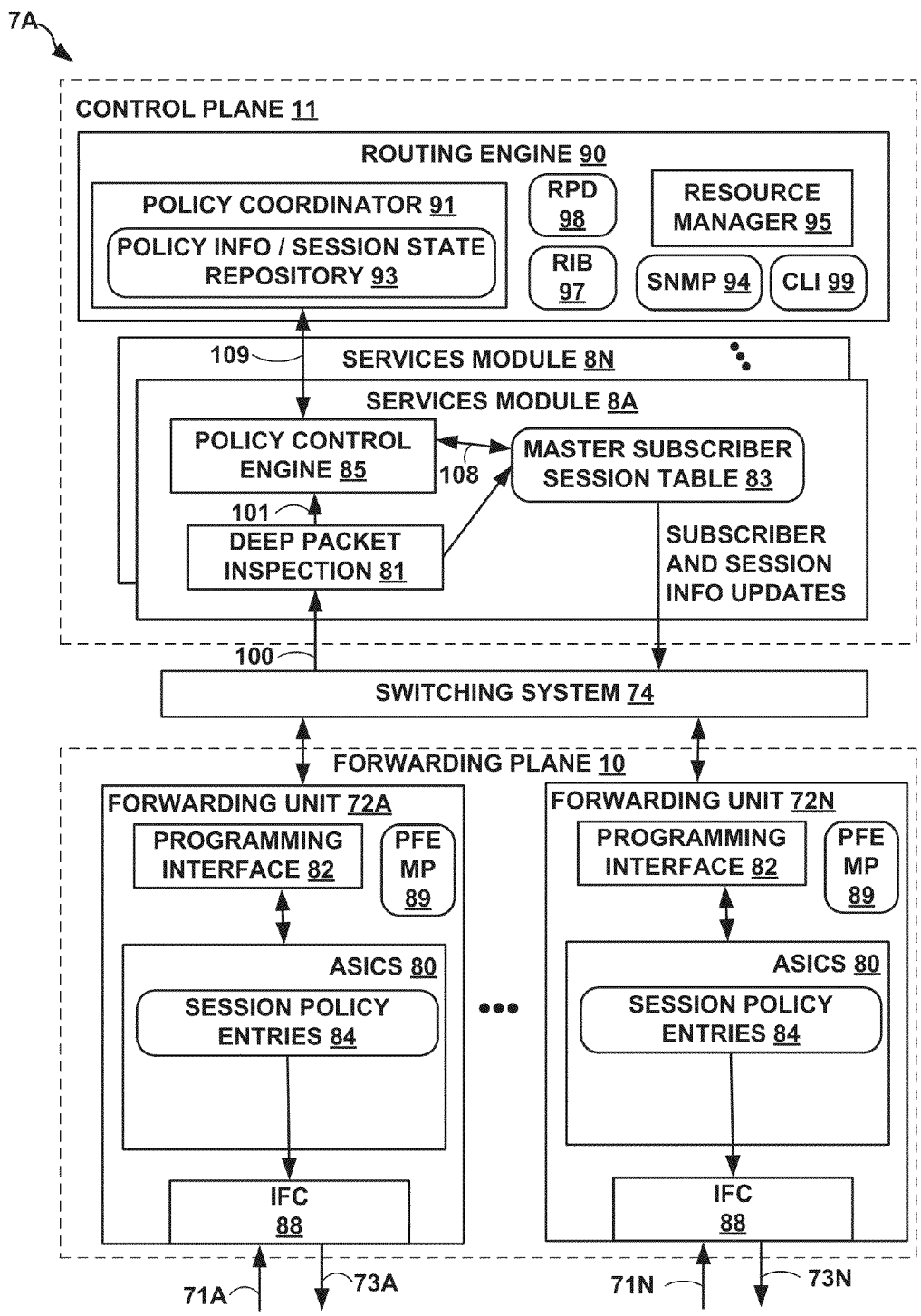
FIG. 3 is a block diagram illustrating an example network device or system with control plane and forwarding plane, where the control plane includes services modules and a routing engine, where the services modules each have a policy control engine and the routing engine has a policy coordinator, and where the forwarding plane receives and uses session policy entries from the control plane according to techniques of this disclosure.

FIG. 2 is a block diagram illustrating a more detailed example network system 20 in which a first service provider network 21A includes radio access network 22 with mobile core network 26, and a second service provider network 21B includes access network 60 with core network 61, in accordance with a variety of network architectures. Service provider networks 21A, 21B ("service provider networks 21") collectively include various gateways and other network devices that process session data flows from subscriber devices 6A-6N ("subscriber devices 6") and subscriber devices 56A-56N ("subscriber devices 56") for accessing a packet data network 14. Any of a variety of gateways and other network devices in service provider networks 21 may represent services gateways 7 of FIGS. 1, 3. These gateways and other network devices include services modules 8 with policy control engines 85 (as shown in FIG. 3) configured for applying a granular, dynamic, and virtualized session policy control for subscriber sessions.

Aspects of radio access network 22 with mobile core network 26 and access network 60 with core network 61 are described as follows, with the understanding that a network may also include variations on these examples. Service provider networks 21 provides access to packet data network 14 through mobile core network 26 and core network 61, respectively. Packet data network 14 supports one or more packet-based services that are available for request and use by subscriber devices 6, 56. As examples, packet data network 14 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 14 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access networks 22 and/or 60, an enterprise IP network, or some combination thereof. In various embodiments, packet data network 14 is connected to a public WAN, the Internet, or to other networks. Packet data network 14 executes one or more packet data protocols (PDPs), such as IP (IPv4 and/or IPv6), X.25 or Point-to-Point Protocol (PPP), to enable packet-based transport of packet data network services.

A mobile service provider operates radio access network 22 and mobile core network 26 to provide network access, data transport and other services to subscriber devices 6. Access network 22 and core network 26 may implement any commonly defined cellular network architecture including those defined by standards bodies, such as a Global System for Mobile communication (GSM) Association, a 3rd Generation Partnership Project (3GPP), a 3rd Generation Partnership Project 2 (3GGP/2), an Internet Engineering Task Force (IETF) and a Worldwide Interoperability for Microwave Access (WiMAX) forum. For example, access network 22 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Access network 22 and core network 26 may, alternatively or in conjunction with one of the above, implement a Code Division Multiple Access-2000 ("CDMA2000") or Enhanced Data Rates for GSM Evolution (EDGE) architecture. Access network 22 and core network 26 may, again as an alternative or in conjunction with one or more of the above, implement a WiMAX architecture defined by the WiMAX forum. While infrastructure elements for each of these standards are not all separately depicted in FIG. 2, it will be understood by those skilled in the relevant field that any of these standards may be involved in example implementations of technologies disclosed herein.

In the example depicted in FIG. 2, mobile core network 26 and radio access network 22 together may be part of a Long Term Evolution (LTE) mobile service provider network ("LTE network") that enables and transports service data traffic exchanged between subscriber devices 6 and packet data network 14. Mobile core network 26 is a packet-switched Evolved Packet Core (EPC) network, and radio access network 22 is an Evolved UMTS Radio Access Network, or E-UTRAN. Subscriber devices 6 communicate using wireless links to base station 24, which may be an evolved Node B (or "eNodeB"), of radio access network 22 to access service provider network 21A. Service provider network 21A may, in some embodiments, include multiple radio access networks coupled to mobile core network 26. Radio access networks 22 may also include, for example, for example, a GSM Radio Access Network (GRAN), a WiMAX radio access network, or a UMTS Radio Access Network (UTRAN), in addition to E-UTRAN.

Other embodiments of radio access network 6 may include additional base stations, which may include Node Bs, eNodeBs, or wireless access points, as well as intermediate devices such as radio network controllers (RNCs). Mobile core network 26 and radio access network 22 may communicate over a backhaul network (not shown) that includes land-based transmission lines, frequently leased by a service provider for mobile service provider network, to transport mobile data and control traffic between base station 24 and serving gateway 28 and Mobility Management Entities (MMEs) 32. The backhaul network may also include network devices such as aggregation devices and routers. Further details of an example mobile access network are described in U.S. patent application Ser. No. 12/905,771, entitled "COLLECTIVELY ADDRESSING WIRELESS DEVICES," filed Oct. 15, 2010, the entire contents being incorporated herein by reference.

Mobile core network 26 may include, for example, a general packet radio service (GPRS) core packet-switched network, an IP-based mobile multimedia core network, or an Evolved Packet Core (EPC) or Evolved Packet System (EPS). Mobile core network 26 provides session management, mobility management, and packet routing and transfer services between radio access network 22 and packet data network 14 to support access, by subscriber devices 6, to services available through packet data network 14. Mobile core network 8 is coupled to packet data network 14 via respective communication links and associated interfaces of packet data network gateways 30A, 30B ("PDN gateways 30"). PDN gateways 30 may implement the functions of services gateways 7 as described with reference to FIG. 1, and are also labeled in parentheses in FIG. 2 as services gateways 7 ("SG 7"). Core packet-switched network 26 comprises intermediate devices required to implement the protocols of a particular architectural embodiment, such as serving gateway 28, PDN gateways 30, and Mobility Management Entities (MMEs) 32. PDN Gateways 30A-30B ("PGWs 30") logically connected to Serving Gateway 28 ("SGW 28") via S5 interface 34 operating over one or more communication links. S5 interface 34 provides protocols to foster user plane tunneling and tunnel management between PGW 30s and SGW 28. S5 interface 34 may comprise a user plane protocol stack that includes GPRS Tunneling Protocol-User Plane (GTP-U) executing over User Datagram Protocol/Internet Protocol (UDP/IP). The term "communication link," as used herein, comprises any form of transport medium, wired or wireless, and can include intermediate nodes such as network devices. SGW 28 hosts mobility anchoring, packet routing and forwarding, lawful interception, and other functionality. PGWs 30 host packet filtering, lawful interception, PDP address allocation, and other functionality. PGWs 30 may also have communicative connections with a separate control device 68A, which may provide virtualized control plane services for PGWs 30, as further described below with reference to FIG. 2 and FIG. 3. Control devices 68A and 68B of FIG. 2 may correspond generally to control device 68 as depicted in FIG. 1.

Mobile core network 26 additionally includes Mobility Management Entity 32 ("MME 32") logically connected to SGW 28 via S11 interface 36 operating over a communication link. S11 interface 36 provides protocols with which MME 32 establishes and manages bearers that traverse or terminate at SGW 28. S11 interface 36 may comprise a control plane protocol stack that includes GTP-Control Plane (GTP-C) executing over UDP/IP. In addition to bearer management and establishment, MME 32 hosts Non-Access Stratum (NAS) signaling, PDN gateway 30 and serving gateway 28 selection, roaming, and authentication, for instance. In various embodiments, mobile core network 26 comprises additional MMEs, SGWs, and/or PGWs.

SGW 28 and MME 32 connect to eNode B 24 ("eNB 24") of E-UTRAN 22 via respective aspects of an S1 interface. Specifically, SGW 28 logically connects to eNB 24 via S1-U interface 38 operating over a communication link, and MME 32 logically connects to eNB 24 via S1-MME interface 40 operating over a communication link to establish bearers over S1-U interface 38 between SGW 28 and eNB 24. S1-U interface 38 may comprise a user plane protocol stack that includes GTP-U operating over UDP/IP. S1-MME interface 40 may comprise a control plane protocol stack that includes S1 Application Protocol (S1-AP) transported by Stream Control Transmission Protocol (SCTP) running over IP. ENB 24 serves subscriber devices 6 via a radio link to eNB 24 operating over a Uu interface 42.

In various architectures, mobile core network 26 may include Gateway GPRS Serving Nodes (GGSN), Serving GPRS Serving Nodes (SGSNs), and Access Gateways (aGW). Various gateways of mobile core network 26, in different architectures, may include services modules that may support deep-packet inspection (DPI), session policy control, firewall, load balancing, billing, and other services for mobile traffic traversing mobile core network 26. Serving gateway 28 or PDN gateways 30 may each comprise a router that executes routing protocols to identify routes through mobile core network 26 or packet data network 14 to various destinations.

Mobile core network 26, radio access network 22, and subscriber devices 6 cooperate to establish and operate bearer channels, or bearers, that, in combination, constitute one or more service bearers to transport mobile traffic, in the form of PDP packet data units (PDUs), which may also be referred to simply as "data packets" or "packets", between subscriber devices 6 and packet data network 14. In general, a bearer is a set of network resources and data transport functions in service provider network 21A to deliver user traffic between two network entities. A bearer may include a path, a logical connection, or a physical or wireless connection between two network devices. A bearer may comprise, for example, an Evolved Packet System (EPS) bearer. Each end-to-end service bearer comprises individual sub-bearers that traverse user plane interfaces, which include Uu interface 42, S1-U interface 38, and S5 interface 34. Conventionally, when subscriber device 6A requests packet delivery services from LTE service provider network 21A by sending an NAS Attach Request message toward eNB 24, eNB 24 notifies MME 32 to cause the MME 32 to select one of PGWs 30. MME 32 may use any PGW selection process, including the PGW selection process described in Section 4.3.8.1 of "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, the entire contents of which are incorporated herein by reference.

For example, MME 32 may request a PGW network address from Domain Name System (DNS) server 44 for an APN provided by wireless device 6 to MME 32 or a default APN for wireless devices attaching to LTE network 21A. DNS server 44 maintains or retrieves from a higher-level DNS server an association between APNs and network addresses of PGWs available to service the associated APNs. DNS server 44 may be local to LTE network 21A or reside in another network. PGWs 30 and packet data network 14 communicate using a Gi interface. Further details regarding bearer setup and management are also found in 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

For example, a particular service bearer between a subscriber device 6A and packet data network 14 may be operated according to session data and various protocols executing on subscriber device 6A, elements of radio access network 22, and elements of mobile core network 26 including one of serving gateways 10 and PDN gateways 30. These session data and protocols may include or be at least in part set by a session policy. A service bearer may be composed of multiple sub-bearers connecting individual elements that operate the respective sub-bearers to implement the service bearer.

While described herein with respect to one or more particular architectures for ease of illustration purposes, radio access network 22 and mobile core network 26 may implement any architecture, including those set forth by any standards body and those proprietarily owned. Moreover, the techniques may apply to any mobile data protocol supported by these architectures. The techniques therefore should not be limited to cellular architecture referenced herein and the mobile data protocols supported by these architectures. serving gateways 10 and PDN gateways 30 and other elements of mobile core network 26, as well as base station 24 and other elements of radio access network 22, may, therefore, each represent an abstraction of devices found within any one of the above mobile network architectures.

Subscriber device 6A may initiate a request to attach to access network 22, by issuing a session request 43 over a communicative interface 42 to radio access network 22, and from there to serving gateway 28. The session request 43 includes a wireless device identity that identifies subscriber device 6 to serving gateway 28. The wireless device identity may represent, for example, an International Mobile Subscriber Identity (IMSI), a Temporary Mobile Subscriber Identity (TMSI), a P-TMSI, a System Architecture Evolution (SAE) TMSI or S-TMSI, an International Mobile Equipment Identity (IMEI), a subscriber username, an MSISDN number (i.e., a "Mobile Subscriber Integrated Services Digital Network Number") or other data identifying subscriber device 6. In this way, serving gateway 28 receives a wireless device identity for subscriber device 6 in the session request 43.

While session request 43 is illustrated in FIG. 2 as a single message from subscriber device 6A to serving gateway 28, session request 43 may represent a plurality of messages that traverse intermediate network devices of access network 22 and mobile core network 26 to identify subscriber device 6A to serving gateway 28. For example, in an LTE architecture, session request 43 may represent an initial Attach Request message issued by subscriber device 6A to base station 24, in the form of an eNode B, which forwards the request to an MME 32. In the illustrated example, MME 32 may incorporate information received in the Attach Request message, including the wireless device identity, into a first Create Session Request message. MME 32 initially selects PGW 30A to process the session requested for the Attach Request message from subscriber device 6A. MME 32 therefore issues the Create Session Request message over S11 interface 36 to serving gateway 28 that includes a number of characteristics of the requested session. The Create Session Request includes, for example, a network address of PDN gateway 30A, an International Mobile Subscriber Identifier (IMSI) and Mobile Station International Subscriber Directory Number (MSISDN), an APN, a radio access technology (RAT) type, and charging characteristics, among other characteristics of the requested session. Serving gateway 28 receives the Create Session Request from MME 32 and generates a second Create Session Request message 46 that incorporates information received by the serving gateway 28 in the first Create Session Request, such as the identity of subscriber device 6A. Serving gateway 28 sends Create Session Request message 46 to PDN gateway 30A to attempt to establish or reuse an S5 interface 34 bearer between serving gateway 28 and PDN gateway 30A for the session between subscriber device 6A and packet data network 14. Subscriber device 6A, eNB 24, MME 32, serving gateway 28, and PDN gateway 30A cooperate to establish the individual sub-bearers over the user plane interfaces and to link the sub-bearers to form a service bearer for the requesting subscriber device 6A.

As another example, session request 43 in a 2G/3G 3GPP network may represent an Activate PDP Context Request message from subscriber device 6A to an SGSN and session request 46 may represent a Create PDP Context Request message from the SGSN to a mobile gateway such as PDN gateway 30B operating as a GGSN. In this instance, PDN gateway 30B allocates, or requests for allocation, a PDP address to subscriber device 6A. PDN gateway 30B then maps the PDP address to the service bearer established for the requesting subscriber device 6A, and subscriber device 6A and PDN gateway 30B may begin exchanging data traffic over LTE radio access network 22 and mobile core network 26. Other network architectures may have similar messaging schemes to identify subscriber device 6A to a gateway as part of an attach procedure or other procedure to establish a requested session. In addition, the initial Attach Request or Active PDP Context Request message may be responsive to a request by a gateway to subscriber device 6A to initiate a session with the gateway.

In various examples, the gateway has a number of services modules that can respond to a session request such as an Activate PDP Context Request message, a Create PDP Context Request message, or other data stream, by creating or otherwise managing a communication session that corresponds to the session request or other data stream. In general, the communication session is an association between service provider network 21A and subscriber device 6A that is identifiable by a combination of a subscriber device identifier for subscriber device 6A, such as a subscriber device PDP address, and an Access Point Name (APN) for one or more services or applications provided by packet data network 14. That is, the communication session (i.e. "subscriber session" or "session") is a session (as specified by the APN) that carries subscriber traffic for one or more services or applications provided to subscriber device 6A, such as communicative connection 12 that carries the subscriber session packet flow containing application flows 12A-12C in FIG. 1. An APN identifies a packet data network and may in some instances further identify a requested service (e.g., Internet, WAP, or multimedia messaging service (MMS)) provided by the packet data network. An APN consists of two parts: (1) a network identifier that defines the external network to which the gateway is connected and optionally a service requested by the user, and (2) an operator identifier that defines the specific operator's packet domain network in which the gateway is located. In other words, the APN is a logical name that determines the appropriate gateway (e.g., PDN gateways 30A, 30B) for the subscriber device 6A and may be used by the gateway to determine the services requested by the subscriber device 6A or the address of an access point in an external packet network to which data packets from the subscriber device 6A should be forwarded. The attach procedure may include establishing a default bearer, and triggering establishment, by service provider network 21A, of one or more dedicated bearers between a gateway, such as serving gateway 28 or PDN gateway 30A or 30B, and subscriber device 6A to subscriber user data traffic.

Each of the services gateways 7 may include a services module 8 with a policy control engine, as indicated above and as further described below with reference to FIG. 3. The policy control engine 85, as shown in FIG. 3, tailors the subscriber session to information specific to the subscriber, and to the corresponding application flows for the individual applications communicating using the subscriber session. The services module continues monitoring the subscriber session packet flow and updates the session policy if new application flows are added or existing application flows terminate. The policy control engine of the services module updates the session policy to a policy coordinator, which may reside on the services gateway 7 or on a virtualized control plane such as on control device 68A, as further described below with reference to FIG. 2 and FIG. 3. If the initial services module is no longer able to continue managing the session for whatever reason, the session may be taken up by another services module, which may consult the policy coordinator to retrieve the current session policy, and continue processing the session with continuity in the applied policy. The current session policy includes any updates to the session policy so that it includes application policies for any current application flows, that is, any application flows that have been initiated but have not yet been terminated in the subscriber session.

For example, PDN gateway 30A may initiate a session in response to session request 43 and/or session request 46, and subsequently redirect the session to PDN gateway 30B. PDN gateway 30A may become congested with data traffic, or detect a maintenance mode or other adverse condition for reliability in constituent links in its routing table, or otherwise determine that PDN gateway 30B is a more appropriate gateway to continue processing the session.

Network system 20 also includes service provider network 21B with a fixed line access network 60 and fixed line core network 61, in this example. Access network 60 aggregates data traffic from one or more subscriber devices 56A-56N for transport to and from core network 61 and packet data network 14. Subscriber devices 56A-56N may include desktop computers, laptop computers, tablet computers, workstations, file servers, print servers, and various other devices. Service provider network 21B includes access network nodes that execute communication protocols to transport control and user data to facilitate communication between subscriber devices 56A-56N and packet data network 14. Service provider network 21B may comprise, for example, digital subscriber line access multiplexers (DSLAMs), switches, network access devices, border routers, other edge routers, broadband remote access servers (BRAS), an IP network, or another type of network that provides access for subscriber devices 56A-56N to packet data network 14. In this example, network switch 62 may comprise digital subscriber line access multiplexers (DSLAMs) or other switching device, that may connect through a network access device 63 to broadband network 65. Network switch 62 may communicate with network access device 63 over a physical interface supporting various protocols, e.g., ATM interface supporting ATM protocols. Network access device 63 may include Broadband Remote Access Server (BRAS) functionality to aggregate output from switches into a higher-speed uplink to broadband network 65. In some embodiments, network access device 63 may comprise a router that maintains routing information between subscriber devices 56A-56N and broadband network 65. Broadband network 65 may implement Multi-Protocol Label Switching (MPLS) forwarding and in such instances may be referred to as an MPLS network. Border router 69 handles data traffic between broadband network 65 and packet data network 14. While a single border router 69 is depicted in FIG. 2, any number and variety of routers and/or other network devices may be used. Border router 69 may also implement the functions of services gateways 7 as described with reference to FIG. 1, and is therefore also labeled in parentheses in FIG. 2 as one of services gateways 7 ("SG 7").

The elements of service provider network 21B may support a variety of protocols, such as Internet Protocol (IP), Frame Relay, Asynchronous Transfer Mode (ATM), Ethernet, Point-to-Point Protocol (PPP), Point-to-Point Protocol over Ethernet (PPPoE), GPRS tunneling protocol (GTP), and virtual local area network (VLAN)-related protocols, among others. For example, using PPP, one of subscriber devices 56A-56N may request access to broadband network 65 and provide login information, such as a username and password, for authentication by authentication device ("AD") 67. PPP may be supported on lines such as digital subscriber lines (DSLs) that connect subscriber devices 56A-56N with network switch 62. In other embodiments, subscriber devices 56A-56N may utilize a non-PPP protocol to communicate with network switch 62. Other embodiments may use other lines besides DSL lines, such as Ethernet over a T1, T3, or other access link. Subscriber devices 56A-56N may each have a dedicated subscriber interface, such as an ATM virtual circuit (VC) or an Ethernet virtual local area network (VLAN), for example, to service provider network 21B.

Any of various gateways or other routers in service provider networks 21, such as serving gateway 28, PDN gateways 30, network access device 63, or border router 69, may comprise an MX-series edge router or an SRX series services gateway offered by Juniper Networks, Inc., of Sunnyvale, Calif. Any of the gateways or other routers in service provider networks 21, which may collectively be referred to as services gateways 7 (in reference again to FIG. 1), may include services modules that process and manages subscriber communication sessions and route session data streams between subscriber devices 6, 56 and packet data network 14. In such instances, the services gateway 7 authenticates or receives authentication for subscriber devices 6, 56, authorizes the devices to access packet data network 14, and may provide network configuration information to the subscriber devices 6, 56. When one of subscriber devices 6, 56 attempts to attach to packet data network 14, a policy control engine on a services module 8 of the services gateway 7 may authenticate the subscriber device using an Authentication, Authorization and Accounting (AAA) protocol, such as Remote Authentication Dial-In User Service (RADIUS) or the Diameter protocol.

Broadband network 65 also includes control device 68B, in this example. Control device 68B may host one or more virtual router control planes. Control device 68B may be connected with one or any number of gateways or other routers in core network 61 (collectively referred to as services gateways 7), and serves as a virtual control plane for any number of services gateways 7. In an illustrative example, control device 68B may include a chassis with multiple routing engine slots hosting multiple routing engines, that may be connected to one or more services gateways 7 and other routers with communicative connections such as redundant Gigabit Ethernet connections. For example, either of control devices 68A, 68B ("control devices 68") may take the form of a Juniper Control System (JCS) control device offered by Juniper Networks, Inc., of Sunnyvale, Calif. Services modules with policy control engines may be hosted in a virtual control plane on the control device 68, and in many ways, function equivalently as if they were physically installed on any of the connected gateways 7, while also providing certain new advantages due to virtualization of the control plane. A corresponding routing engine hosting a policy coordinator may also be hosted on control device 68, in connection with one or more services modules. The routing engine may therefore also function equivalently in many ways whether physically present on an individual services gateway 7 or on a virtual control plane hosted by control device 68 in a communicative connection with a given gateway. Some embodiments may not include a separate control device. In such embodiments, services gateways 7 such as PGWs 30 or border router 69 may perform all control plane functions internally.

In some embodiments, a services gateway 7 includes a switching device that forwards layer two (L2) traffic based on, for example, media access control (MAC) layer addresses. L2 traffic may include Ethernet frames addressable by MAC layer addresses that may be used, in accordance with the techniques described herein, to identify a subscriber or subscriber class. In this example, one or more network service providers that administer network system 20 offer services on a per-subscriber basis to subscriber devices 6, 56 that access the service provider networks 21. Services offered may include, for example, traditional Internet access, Voice-over-Internet Protocol (VoIP), video and multimedia services, and security services. A network service provider may configure service provider networks 21 to offer services to subscribers in accordance with one or more service level agreements (SLAs) that define network performance levels in a number of dimensions, including the type of offered services and corresponding service parameters (e.g., upstream/downstream bandwidth, reliability (e.g., up-time), security, quality of service, rate limits, and others). In this way, SLAs or other service agreements may govern communication between service provider networks 21 and subscriber devices 6, 56. These SLAs and similar information therefore constitute subscriber information that may be read by a policy control engine on a services module on a services gateway 7. The policy control engine then bases a session policy in part on this subscriber information.

Any one of subscriber devices 6, 56 may begin exchanging data packets with packet data network 14, and such packets traverse at least one services gateway 7 as members of at least one packet flow. The term "packet flow" refers to a set of data packets originating from a particular source device and sent to a particular destination device as part of an application communication session between the source and destination device. The terms "data stream", "data flow", and "packet flow" may be understood to indicate the same or similar concepts of a flow of packetized data, in accordance with a packet protocol such as IPv4, IPv6, X.25, or some other packet protocol. A flow of packets, in either the upstream direction (i.e. sourced by one of subscriber devices 6, 56) or downstream direction (destined for one of subscriber devices 6, 56), may be identified by the five-tuple: <source network address, destination network address, source port, destination port, protocol>. This five-tuple generally identifies a packet flow to which a received packet corresponds and, depending on the flow direction, one of subscriber devices 6, 56 may be associated with either the source network address or the destination network address of the packet flow. For example, one of subscriber devices 6, 56 may establish a subscriber session with services gateway 7 such that the subscriber session supports multiple application flows for corresponding applications. Each of the application flows has distinct quality of service (QoS) parameters that correspond with the service or application being carried over each of the bearer channels, such as VoIP or bulk data transfer, and with the subscriber information, e.g. levels of service in the SLA. A deep packet inspection (DPI) component in a services module of services gateway 7 may identify each of the application flows in the data flows to/from the subscriber device 6, 56. Packet flows may therefore also be characterized and identified according to other characteristics, including VLAN tags, PPPoE session, and GTP tunnel identifiers of network layer or data link layer protocol headers/tags that encapsulate the packets. Further details on the operation of the services modules of services gateway 7 are provided in the description of FIG. 3 below.

FIG. 3 is a block diagram illustrating in detail an example of services gateway 7A of FIG. 1 that applies granular policies using techniques described herein. Services gateway 7A in this example includes two logical and/or physical planes: control plane 11 and forwarding plane 10. That is, the network device implements two separate functionalities, i.e. the routing/control functionality and the data forwarding functionality. The network device may implement these two separate functionalities either logically, e.g., as separate software instances executing on the same set of hardware components, and/or physically, e.g., as separate dedicated physical hardware components that either implement the functionality in hardware or dynamically execute software or a computer program to implement the functionality. A wide variety of components of forwarding plane 10 and control plane 11 may be implemented either as hardware or as various combinations of hardware and software.

The physically separate components may also be either components of a single device, or components of separate devices, and the combined network device depicted in FIG. 3 may be considered a device or a system that includes components distributed across one or more network-connected physical devices. In some examples, control plane 11 is part of a gateway or other router, such as services gateways 7 of FIG. 1 or serving gateway 28, PDN gateways 30, network access device 63, or border router 69 of FIG. 2, and control plane 11 and forwarding plane 10 are contained within a single services gateway. In other examples, all or part of control plane 11 is a virtual control plane, hosted by a virtualized control device such as control devices 68 of FIGS. 1 and 2, where the virtualized control device provides virtual control plane services to one or more separate services gateways or other routers. In either case, control plane 11 is connected, via a switching system 74, to data or forwarding plane 10, which forwards network traffic in accordance with forwarding information. In one example, an individual gateway or other network device may use control plane functionality in its own physically local control plane hardware and/or in a virtual control plane provided by one or more physically separate virtual control plane elements such as control devices 68 of FIG. 2. For convenience, control plane 11 and forwarding plane 10 of FIG. 3 may be collectively referred to as services gateway 7A, with the understanding that control plane 11 may equivalently be either a physically local and integrated portion of an individual services gateway 7A, or parts or all of control plane 11 may be a virtual control plane distributed among one or more separate control devices. Either of these states may apply to any of services gateways 7 of FIG. 1 or serving gateway 28, PDN gateways 30, network access device 63, or border router 69 of FIG. 2, and the description of services gateway 7A of FIG. 3 may apply in any of the above cases.

Control plane 11 includes services modules 8A-8N ("services modules 8") and a routing engine 90. Each of the services modules 8 has a deep packet inspection component 81 ("DPI 81"), a policy control engine 85, and a master subscriber session table 83. The routing engine 90 has a policy coordinator 91 that maintains a repository 93 of policy information and session state for session policies. Routing engine 90 executes the routing functionality of services gateway 7A, and may also have additional components such as a resource manager 95, a routing information base (RIB) 97, a routing protocol daemon (RPD) 98, command line interface daemon (CLI) 99, and a Simple Network Management Protocol ("SNMP") daemon 94, for example. Routing engine 90 represents hardware or a combination of hardware and software that implements routing protocols by which routing information stored in RIB 97 may be determined. RIB 97 stores information defining a topology of a network, such as service provider networks 21 of FIG. 2. Routing engine 90 resolves the topology defined by routing information in RIB 97 to select or determine one or more routes through the network. Routing engine 90 may then update forwarding plane 10 with these routes, where forwarding units 72 of forwarding plane 10 may store these routes in forwarding information bases (not depicted in FIG. 3). Routing engine 90 may also combine routing information with session policy information, including specific policy information for individual application flows, and make this routing information and session policy information available for control plane 11 to provide to forwarding plane 10. These elements are discussed in more detail below.

In addition, routing engine 90 may include resource manager 95 operating as a process or "daemon" to receive static or dynamic resource-related information for services gateway 7A and publish the information to services modules 8 and packet forwarding engines 72. For example, resource manager 81 may be statically configured, by an administrator or other entity using a management interface, with information describing services modules 8 such as the respective capacities of the individual services modules 8 (e.g., the number of subscriber sessions that each of the services modules 8 is able to manage or the particular APNs serviced by services modules 8). Further details of one example embodiment of a router can be found in U.S. patent application Ser. No. 12/182,619, filed Jul. 30, 2008, entitled "STREAMLINED PACKET FORWARDING USING DYNAMIC FILTERS FOR ROUTING AND SECURITY IN A SHARED FORWARDING PLANE," which is incorporated herein by reference.

Control plane 11 communicates through switching system 74 with forwarding plane 10 in the example of FIG. 3. The subscriber session management is distributed among services modules 8, which individually receive and satisfy requests to create/update subscriber sessions thereafter managed by respective service modules 8. That is, services modules 8 of control plane 11 provide decentralized subscriber session setup and management for services gateway 7A. As part of session creation and modification, services modules 8 may receive, e.g., from an AAA server (not depicted), subscriber information that prescribes one or more policy rules for application flows associated with the subscriber session. These policies may be defined by the subscriber's service level agreement (SLA). Internally, each of services modules 8 includes a unique identifier that identifies the services module 8 to other components of service provider networks 21. Identifiers for services modules 8 may include, for example, an index, identifying string, internal IP address, or link layer address.

Forwarding plane 10 may initially receive a new application flow in a subscriber session packet flow and forwards it to services module 8A to determine a new update to the session policy for the subscriber session to handle the new application flow in combination with any existing application flows in the subscriber session. After functions performed by services module 8A as described below, services module 8A provides the updated session policy entry 84 for the subscriber session to forwarding plane 10 via switching system 74.

Services module 8A processes at least a portion of a subscriber session packet flow using a deep packet inspection (DPI) function. When services module 8A receives data packets associated with a subscriber session in a subscriber session packet flow 100 from forwarding plane 10, services module 8A determines subscriber information for the data packets by, for example, associating an IP address of the data packets with a subscriber session. Subscriber information may comprise an IP address of a subscriber device obtained from the data packets that policy control engine 85 may associate to a session policy for a subscriber.

In addition, DPI component 81 applies DPI to the data packets to identify application identity information for one or more application flows for the subscriber session. The application identity information may include an application identifier ("application ID") that DPI component 81 assigns to the application based on its inspection of the packets in the application flow. DPI component 81 forwards this subscriber information and application identity information, collectively referred to as DPI output 101, to policy control engine 85. DPI component 81 may interface with policy control engine 85 using an Authentication, Authorization and Accounting (AAA) protocol, such as Remote Authentication Dial-In User Service (RADIUS), the Diameter protocol, or another protocol. DPI output 101 is further discussed below with reference to FIG. 5. The deep packet inspection function of DPI component 81 is further discussed below with reference to FIG. 4.

Policy control engine 85 then applies a session policy to the session for the subscriber data stream based at least in part on the subscriber information and the application identity information. The session policy determines configurable packet processing operations, such as packet forwarding, bandwidth, quality of service, filtering, rate limiting, marking, accounting, dynamic-request change of authorization (CoA), policy-based routing and redirection, advertisement insertion, lawful intercept, class of service, and traffic shaping, for instance, to the application data streams exchanged between subscriber devices 5, 6, 56 and packet data network 14. The session policy may include a filter, classifier, class of service queue, counter, policer, lawful intercept component, traffic flow template, routing table, or mobility tunnel endpoint identifier handler, for example. The session policy may also be associated with a PDP address allocated by the service provider networks 21 for the subscriber device for use in sending and receiving subscriber session data packets; routing information used by services module 8A in directing the forwarding of session data packets, such as tunnel endpoint identifiers (TEIDs) and identifiers or addresses for downstream nodes; the APN for the session; and session policy characteristics such as bandwidth, priority, quality of service (QoS) profiles, dynamic IGMP, firewall filter, and class of service (CoS) configuration, for each of the individual application data streams in the subscriber session, for example.

Policy control engine 85 forwards the session policy information 108 for a given session to master subscriber session table 83. Session policy information 108 is further discussed below with reference to FIG. 5. Services module 8A then downloads a representation of the session policy from master subscriber session table 83 via switching system 74 to forwarding units 72 of forwarding plane 10.

Switching system 74 may include Q fabric or other switch fabric, an external local area network (LAN), an internal router LAN, a virtual LAN (VLAN), a cross-bar, bus, link, or other switching elements. In gateway examples, switching system 74 may include a LAN internal to the gateway. Switching system 74 may comprise a 100 Mbps or 1 Gbps Ethernet connection, for instance. Examples of high-speed multi-stage switch fabrics used for relaying packets between units within a router are described in U.S. Patent Application Publication Number 2008/0044181, entitled MULTI-CHASSIS ROUTER WITH MULTIPLEXED OPTICAL INTERCONNECTS, the entire contents of which are incorporated herein by reference. In virtual control plane examples, switching system 74 may include an external LAN and/or other switch elements connecting a gateway that hosts forwarding plane 10 with the separate control device 68B hosting the virtualized control plane. In this case, switching system 74 and virtualized control plane 11 are still equivalently available to forwarding plane 10, so that forwarding plane 10 interacts with control plane 11 without experiencing any negative effects of not having a physically adjacent control plane.

Forwarding plane 10 has a number of forwarding units 72A-72N ("forwarding units 72") in this example that provide high-speed forwarding of network traffic, received via inbound links 71A-71N, to outbound links 73A-73N. Services modules 8 download representations of the session policy from master subscriber session table 83 via switching system 74 to forwarding plane 10, which saves the session policy in session policy entries 84 or as an update to session policy entries 84 in forwarding units 72. Forwarding units 72 apply session policy entries 84 to the incoming application flows 71 to forward the application flows in accordance with the updated session policy defined in session policy entry 84 in a high-speed manner. Forwarding plane 10 may use configurable parameters based on the session policy for processing and forwarding the packets in the session data stream in accordance with the session policy.

Forwarding units 72 may comprise one or more packet forwarding engines coupled to respective interface cards 88 ("IFCs 88") which may represent, for example, a dense port concentrator (DPC), modular port concentrator (MPC), flexible physical interface card (PIC) concentrator (FPC), or another line card, for example, that is insertable within a chassis or combination of chassis of services gateway 7A. The interface cards may include interfaces for various combinations of layer two (L2) technologies, including Ethernet, Gigabit Ethernet (GigE), and Synchronous Optical Networking (SONET) interfaces, for example. Further details of certain example embodiments of forwarding planes are found in U.S. patent application Ser. No. 13/172,505, filed Jun. 29, 2011, entitled "VARIABLE-BASED FORWARDING PATH CONSTRUCTION FOR PACKET PROCESSING WITHIN A NETWORK DEVICE", which is incorporated in its entirety by reference herein. The subject matter of the present disclosure may also function advantageously with a variety of other forwarding plane components and functions besides those specifically described in those references, and is not limited to interaction with the specific embodiments disclosed therein.

In one example, policy control engine 85 records a session policy on master subscriber session table 83, and services module 8A forwards a representation of session policy from master subscriber session table 83 to forwarding plane 10, and later forwards updates to the session policy, as described in more detail below, such that forwarding unit 72N stores the session policy and stores the updates to the session policy in session policy entries 84 as they arrive. The forwarding unit 72N defines the packet processing based at least in part on values in the session policy. In one illustrative example, the session policy may include an associated key structure that packet forwarding engine 72N may use to map packets having matching packet properties to the session policy. Packet properties matched may include, for example, packet metadata such as a particular packet's ingress interface or egress interface (as determined by the packet forwarding engines 72) as well as information carried by the packet and packet header, such as packet header fields, destination route prefixes, VLAN tags, layer four (L4) or Transport Layer protocol destination ports, tunnel header metadata (e.g., TEIDs), and the packet payload.

Forwarding units 72 may include ASIC-based packet processors that map packets to session policies and execute processing paths in accordance with the session policies received from services modules 8. The one or more application-specific integrated circuits 80 ("ASICs 80") of forwarding units 72 may include key engines (not depicted in FIG. 3) that execute microcode (or microinstructions) to control and apply fixed hardware components of the ASICs 80 to process packet keys. A packet key includes packet fields and other parameters that determine a flow of packet processing for the packet along an internal processing path. Forwarding units 72 may also include an associated key buffer (not depicted in FIG. 3) to store packet field data for corresponding packets that the key engine is currently processing. The key buffer may also provide limited writable memory to which elements of the internal processing path may write to pass messages accessible by future elements. ASICs 80 may include session policy entries 84 that store session policy entries 84 generated by control plane 11.

The internal processing paths of the ASICs 80 of forwarding units 72 may comprise programmable, executable microcode and fixed hardware components that determine the packet processing actions and other operations performed by forwarding units 72. ASICs 80 may include processing paths that may include service objects in the form of, for example, executable instructions, programmable logic, and application-specific logic that implement session policies, perform lookups, rate limit packet flows, count packets, implement classes of service, perform lawful intercept, classify packets, apply filters, route packets, and manipulate packet keys, among other functions. Forwarding units 72 may store executable instructions for processing paths in computer-readable storage media, such as static random access memory (SRAM). Executable instructions for the processing paths may be stored within the ASICs 80 or in memory external to the ASICs 80 onboard the forwarding units 72. Forwarding units 72 may also store additional data structures such as session policy entries 84 in computer-readable storage media, such as internal or external SRAM. In another implementation, a forwarding unit 72 may have a configuration and sufficient processing power to forward packets on its own as a single processing complex, without having to interact with a separate services module 8.

The service objects each implement a service for application to a packet upon execution of the template path by the forwarding plane 10. The service objects may each represent, for example, a different counter in a bank of counters, a different queue in a set of class of service queues, different filters or policers, or different next hops for handling mobility tunnels for different packet flows. Some of the service objects 84 are commonly applied to each packet flow mapped via one of session policy entries 84 to the processing paths. The forwarding plane 10 executing the service objects for a packet uses session policy entries 84 to alter the processing path within the service objects based on the packet flow to which the packet belongs.

In some aspects, one or more service objects of the processing paths comprise a next hop data structure to initiate processing. At the end of each processing step by the key engine, the result is a next hop that may specify additional processing or the termination of processing, for instance. In addition, next hops may specify one or more functions to be executed by the key engine and/or one or more hardware elements to be applied (e.g., policers). Next hops thus form the primary data structure that can be used to initiate a service, chain next hops to allow for multiple services to be performed on a single packet, and terminate an internal processing path. The key engine may be associated with a result (or "lookup") buffer (not depicted) that stores results for executing next hops. For example, the key engine may execute a lookup specified by a next hop and store the result of the lookup to the associated result buffer. The contents of a result buffer may affect the actions of the next hop in the next hop chain.

PFE microprocessor 89 ("illustrated as PFE MP 89") manages ASICs 80 and executes programming interface 82 to provide an interface with control plane 11. PFE microprocessor 89 may execute a microkernel to provide an operating environment for programming interface 82. Programming interface 82 receives instructions from control plane 11 directing forwarding unit 72 to configure internal forwarding logical interfaces of the processing paths, for processing data packets in one or more application flows in the subscriber session. For example, forwarding unit 72 receives data packets in the subscriber session, maps the subscriber session data packets to the session information and application identity information in the current session policy entry 84, and forwards the subscriber session data packets according to this session information and application identity information. For example, forwarding of downstream session data packets by forwarding unit 72 for the session specified in session policy entry 84 may include encapsulating the session data packets using the GPRS Tunneling Protocol (GTP) and setting the specified downstream TEID for the session within a GTP header, in one example.

Control plane 11 may map an incoming subscriber session packet flow to one of session policy entries 84 to identify the session policy with which to process the subscriber session packet flow. A subscriber session is associated with an upstream packet flow and a downstream packet flow, and a particular subscriber session may include multiple application flows accessing multiple applications or services. The packet parameters for each application flow in each subscriber session are determined by DPI component 81 and policy control engine 85 of services module 8A and are provided to session policy entries 84 in forwarding unit 72N, in an illustrative example. The values for the packet parameters as provided in session policy entries 84 uniquely identify a packet as belonging to a particular application flow for a subscriber session that connects to services gateway 7A.

Defining a session policy to deal granularly with each application flow and its bandwidth requirements and other characteristics enables highly efficient usage of network resources. For example, some increasingly prevalent applications such as voice over internet protocol (VoIP) based services and video phone calls require much greater bandwidth than many other applications, such as email or Web browsing. Identifying VoIP or video application flows is helpful in treating or prioritizing them efficiently from a network perspective. Session policy control using policy control engine 85 and policy coordinator 91 allows for dynamic service activation and policy application, thus removing the need to carve out bandwidth statically. Control plane 11 can also report if an application flow cannot be set up due to bandwidth constraints.

Control plane 11 including policy control engine 85 therefore provides on the fly dynamic policy control that can rate limit, differentiate, or offload traffic on the basis of each application flow with a subscriber session, and as the application flows change over the course of the subscriber session. The session policies adapt to the changing subscriber traffic profile of a subscriber session, and differentiate or prioritize between individual application flows belonging to the same subscriber session. Control plane 11 provides an integrated, virtual policy control function that is capable of granular and dynamic on the fly policy control. This granularity enables prioritization between application flows generated either by a single subscriber or between multiple subscribers. The policy control may take place in real time, with policy updates being triggered by the activation or deactivation of application flows. The processing of the underlying subscriber session management is distributed between different modules, thus avoiding the overloading of a single module. The session policy can provide differential treatment for the same subscriber device running different applications or accessing multiple services during the same session that may benefit from differential treatment.

For example, a user who has subscribed to a premium service or application may start a session that consists of application flows that are based on both the premium service and also a best effort application. With control plane 11 providing dynamic policy control, services gateway 7A processes different application flows generated by the user's subscriber device according to individually tailored application policies. For example, services gateway 7A may place different application flows in varying forwarding classes, and individually rate limit and handle the different application flows, so that the best effort application isn't put in the same forwarding class or given the same rate limiting and handling as the premium service. This allows a service provider network 21 to provide the services needed per application, without devoting more bandwidth or resources than necessary to any of the applications, thereby enhancing the efficiency of service provider network 21. Policy control engine 85 therefore provides on the fly policy control that is both granular and dynamic, in that it tailors a session policy around each application flow in the session, and updates the session policy as the application flows change over the course of the session.

The policy control function is distributed among the policy control engine 85 in services module 8A, and the main policy coordinator 91 in routing engine 90 (RE) of control plane 11, whether it is a virtual control plane or internal to a services gateway 7A. Policy control engine 85 and policy coordinator 91 signal each other internally to the control plane 11. After policy control engine 85 reads the subscriber information and application identity information of the application flows in a subscriber session packet flow, as forwarded in DPI output 101, and applies policies dynamically based on the application identity information of each of the applications, policy control engine 85 updates the main policy coordinator 91 on the routing engine 90 with policy coordination output 109, comprising the session information and the creation or changes to the session policy. The policy control engine 85 on each of one or more services modules 8 communicates such session policy information about each of their subscriber sessions to policy coordinator 91. Policy coordination output 109 is discussed further with reference to FIG. 5 below.

The policy coordinator 91 maintains a central repository of policy and session information that can be used to give the session policy information high availability. The session information on the policy coordinator 91 can be used to maintain session state and policy information between the services modules 8 in case of congestion or failure of any one or more of services modules 8. A different services module 8N may take over a subscriber session if the original services module 8A handling the subscriber session becomes unavailable, and policy coordinator 91 may communicate the session policy information for the subscriber session to services module 8N. The policy control engines 85 on the different services modules 8 updates the policy coordinator 91 at programmable time intervals or as the session policies are updated, in different examples.

The services modules 8 each maintain a master subscriber session table 83 that comprises subscriber sessions to which policies have been applied. Services module 8A updates the forwarding units 72 with this subscriber session information from master subscriber session table 83, resulting in a corresponding session entry 84 on the forwarding units 72, as indicated above. Forwarding units 72 handle the subsequent processing of traffic flows for the subscriber session, unless or until they detect addition of a new application flow or termination of an existing application flow, in which case forwarding plane 10 may then communicate the changes in the application flows to services module 8 for an update on the session policy. The distribution of session information avoids the overloading of the services modules 8 for any subsequent processing of packet data flows. The functions of the various control plane elements during session creation, modification, and closing are described further below with reference to FIG. 4 and FIG. 5.

The granularity of applied policies enables prioritization between traffic streams generated either by a single subscriber or between multiple subscribers. The policy control takes place on the fly, i.e., policy updates may be triggered by the activation or deactivation of application data streams in the subscriber session. These data traffic streams may belong to one or multiple subscribers. Granular, dynamic policies applied in real time provide for better bandwidth management and charging control, and enable the operators of service provider networks 21 with the flexibility to charge a subscriber based on applications or services the subscriber device accesses as well as actual volume and time of usage.

Policy control engines 85 in services modules 8, and policy coordinator 91 in routing engine 90, therefore act together as an integrated, virtual policy engine, that enhances the capability of a services gateway router or a virtual control plane, and eliminates any overhead associated with a standalone policy control device. This integrated, virtual policy control can be integrated with a network operating system such as the JUNOS network operating system offered by Juniper Networks, Inc. of Sunnyvale, Calif.

Control plane 11 components may include one or more processors (not shown in FIG. 3) that may implement the functions of any or all of the depicted components thereof in various combinations of hardware or in software running on hardware components. Different components of control plane 11 may execute software instructions, such as those used to define a software or computer program, stored to a computer-readable storage medium (not shown in FIG. 3), such as non-transitory computer-readable mediums including a storage device (e.g., a disc drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control plane 11 may include dedicated hardware, such as one or more integrated circuits, one or more Application Specific Integrated Circuits (ASICs), one or more Field Programmable Gate Arrays (FPGAs), one or more Digital Signal Processors (DSPs), or any combination of one or more of the foregoing or other examples of dedicated hardware, for performing the techniques described herein.

Figure 4:
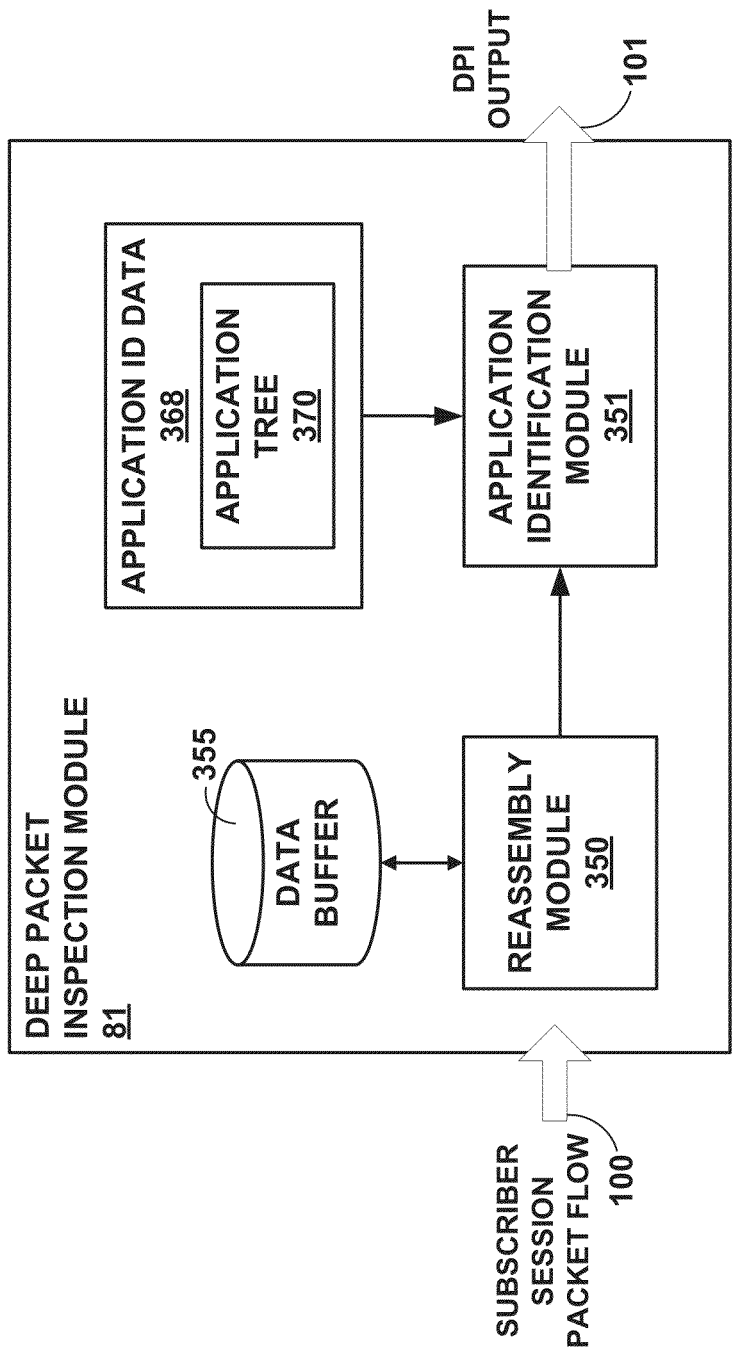
FIG. 4 is a block diagram illustrating an example deep packet inspection component.

FIG. 4 is a block diagram showing additional detail for the deep packet inspection function of DPI component 81 of services module 8 of a services gateway 7. In this example, DPI component 81 performs stateful inspection of a subscriber session packet flow 100 received from forwarding plane 10. In this example, DPI component 81 includes reassembly module 350, data buffer 355, application identification module 351, and application identification data 368.

When DPI component 81 receives a packet as part of subscriber session packet flow 100, reassembly module 350 may initially buffer the packet in data buffer 355. In one embodiment, data buffer 355 may store data as a sliding window. That is, data buffer 355 may store data until becoming full or reaching a specified required amount of minimum data for identification. When full, data buffer 355 discards certain data to make room for storing new data. In one embodiment, data buffer 355 may store and discard data according to a first-in, first-out (FIFO)-like protocol wherein the first data to be stored is the first data to be discarded when data buffer 355 becomes full. In another embodiment, data buffer 355 may discard data according to a least recently used protocol wherein, when data buffer 355 is full, the packet flow which has been least recently used will be discarded to make room for new data to be stored.

As reassembly module 350 receives inbound subscriber session packet flow 100, it reassembles application-layer data from the subscriber session packet flow 100 by removing any underlying transport information (e.g., OSI layer 4 information and below). Reassembly module 350 forwards the reassembled application-layer data as application flows to application identification module 351 for initial processing.

In one embodiment, reassembly module 350 may associate packets in a packet flow, and packet flows as a communication session, according to the 5-tuple {source IP address, destination IP address, protocol, source port, destination port}. Other embodiments may use other forms of associating packets. For example, in one embodiment, services gateway 7 may be part of a network that utilizes virtual local area networks (VLANs). Accordingly, reassembly module 350 may associate packets in a packet flow according to a VLAN identifier, a source address, and a destination address. In various examples, reassembly module 350 may utilize the information maintained within a flow table (not depicted) comprised in services module 8 to reassemble network data, e.g., to form reassembled TCP data.

Application identification module 351 may process application-layer communications 332 to identify the type of application and underlying protocol for each application flow in a subscriber session. More specifically, application identification module 351 may analyze the reassembled application data for the packet flow to identify the type of application and protocol associated with the packet flow. Application identification module 351 may output application identity information in the form of an application identifier that indicates the identified application. For example, application identification module 351 may output an application identifier of "HTTP" to indicate that the packet flow originated from a software application operating according to the HyperText Transfer Protocol (HTTP). Moreover, application identification module 351 may also determine whether the application-layer data contains tunneled application-layer data. That is, application identification module 351 determines whether the packet flow originated from a plurality of stacked OSI Layer 7 (L7) software applications, i.e., where one L7 software application is using one or more other L7 software applications as a data transport. In such instances, application identification module 351 outputs an application identifier for the "lowest" one of the stacked application-layer protocols as application identity information for the application flow.

To aid in identifying applications, application identification data 368 may include a hierarchically ordered list of applications, such as application tree 370, that is organized to represent known L7 applications that may originate packet flows. DPI component 81 may maintain application tree 370 as a tree structure in a computer-readable medium. An administrator may use a user interface (not shown) to modify the contents and hierarchy of the list. Upon receiving a packet flow which may belong to one of several similar applications, application identification module 351 may determine the most likely candidate application. As application identification module 351 receives more information about the packet flow, application identification module 351 may alter the original determination accordingly.

In one embodiment, DPI component 81 may instantiate multiple application identification modules that work together in sequence or in parallel to attempt to identify one or more applications associated with a particular subscriber session. For example, an array of application identification modules may operate in parallel, each application identification module applying a different set of signatures, to attempt to identify the application(s) associated with a particular subscriber session. Moreover, other embodiments may use arrays of other modules. For example, one embodiment may utilize an array of application identification modules.

In some embodiments, multiple L7 applications may independently utilize the same subscriber session packet flow. Accordingly, in some embodiments, DPI component 81 may use application identification module 351 to continually apply application signatures from application tree 370 to a subscriber session packet flow to determine transitions from one L7 application to another for the same L7 protocol (e.g., HTTP) of the same packet flow. In some embodiments, DPI component 81 may partition each subscriber session packet flow into a sequence of data blocks, i.e., "chunks," and reconstruct the stack of protocol decoders, if necessary, upon processing each chunk. For example, it may only take 400 bytes of data at maximum to either make a determination of the identity of an application or to determine that the application identity cannot be determined. Consequently, DPI component 81 may utilize delimiters 400 bytes apart within the data stream to segment the data stream into 400 byte chunks; once a delimiter for a particular chunk is reached, application identification module 351 may start the attempt to determine the identity of the application associated with the next 400 byte chunk of data. In one example the 400 byte buffer is a tunable limit set by an administrator or script.

In one embodiment, a co-processor may perform the functions of application identification module 351. That is, a co-processor dedicated to the task of determining the identity of an application may perform the functionality of application identification module 351. A primary processor of DPI component 81 may offload the responsibility for identifying applications associated with a subscriber session packet flow to the application identification co-processor. The co-processor may share one or more computer readable media with a primary processor. For example, the shared computer-readable medium may include instructions for each processor to cause each processor to perform the associated tasks. The medium may be a computer-readable storage medium, such as random access memory (RAM), dynamic RAM (DRAM), static RAM (SRAM), read only memory (ROM), programmable ROM (PROM), erasable PROM (EPROM), electrically erasable PROM (EEPROM), Flash memory, or any other suitable computer-readable media. Such computer-readable media may also be used in various embodiments to store instructions to cause one or more programmable processors to perform the functions described herein.

DPI component 81 provides results of its inspection of subscriber session packet flows as DPI output 101 comprising subscriber information and application identity information to policy control engine 85 for application of policy rules to each of the application flows, as further described below with reference to FIG. 5. DPI component 81 continues inspecting the subscriber session packet flow and providing updated DPI output 101 to policy control engine 85 as it detects new application flows being added or existing application flows being terminated.

Figure 5:
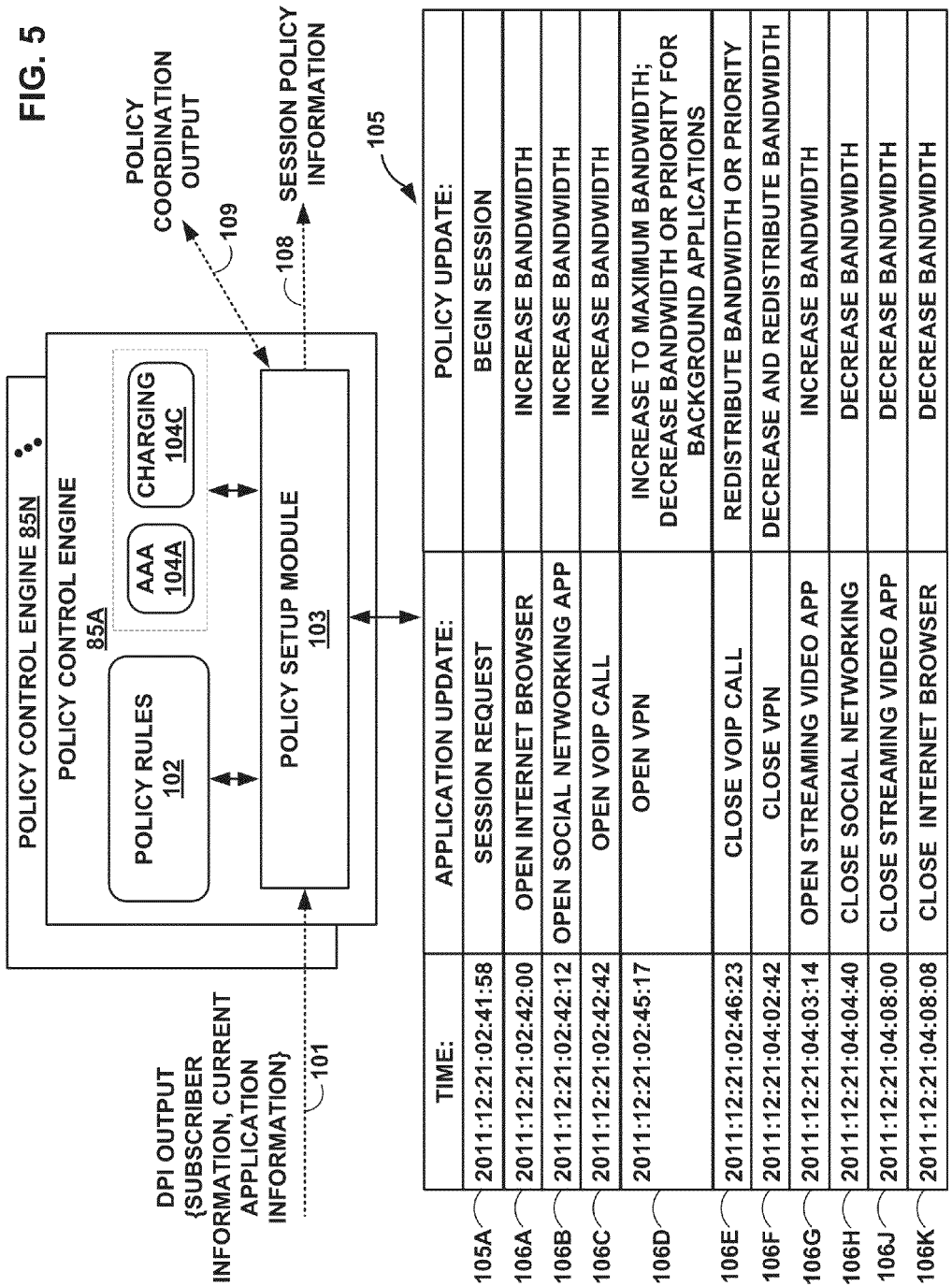
FIG. 5 is a block diagram illustrating example operation of a policy control engine in accordance with techniques described herein.

FIG. 5 is a block diagram illustrating a policy control engine 85 receiving new and/or updated information on the application flows of a subscriber session, creating and dynamically updating the session policy based on the subscriber information and the ongoing changes in the data flows of the individual applications in the session, and forwarding the updated session policy to a master subscriber session table and to a policy coordinator. Forwarding unit 72A sends at least a portion of packets of subscriber session packet flows to services module 8A, where they are first inspected by DPI component 81, which then passes them to policy control engine 85A as shown in FIG. 5.

In particular, as shown in the context of FIG. 3, services module 8A has received a session request and established the subscriber session. Forwarding unit 72A subsequently sends at least a portion of the subscriber packet flow for the subscriber session to services module 8A that anchors the subscriber session. DPI component 81 receives this subscriber packet flow for the subscriber session, analyzes the application flows therein to identify one or more corresponding applications, as described with reference to FIG. 4, and forwards DPI output 101 including application identity information to policy control engine 85. DPI component 81 may use an Authentication, Authorization and Accounting (AAA) protocol, such as Remote Authentication Dial-In User Service (RADIUS), the Diameter protocol, or another protocol, in forwarding DPI output 101 to policy control engine 85.

Policy control engine 85A processes DPI output 101 through a policy setup module 103, a stateful session protocol module that performs the core functions of policy control engine 85A of initially generating and subsequently updating session policies to forward to master subscriber session table 83 and policy coordinator 91. Policy setup module 103 has access to policy rules 102 and to control protocols (collectively control protocols 104) such as an authentication, authorization, and accounting (AAA) protocol 104A and a charging protocol 104C that enables communication with a policy charging rules function (PCRF) entity, for example. In the illustrated example, policy setup module 103 executes control protocols 104 to obtain subscriber-specific information, including policy rules 102, for the subscriber session associated with DPI output 101. As a result, each of policy control engines 85 of associated services modules 8 may independently operate to execute control protocols 104 to receive policy rules 102 for a subscriber and generate session policy entries 84 to apply on a per-application flow basis to subscriber sessions. Policy setup module 103 may use information from subscriber records associated with the subscriber device and the application identity information, such as application IDs, generated by DPI component 81 for each of the application flows in the subscriber session packet flow in creating and subsequently updating the session policy for the subscriber session.

Session policy table 105 shows how policy setup module 103 creates, continually updates, and eventually closes a representative subscriber session, and updates the session policy over the course of the session in response to changes in the application flows in the session. The information represented in session policy table 105 as depicted in FIG. 5 may take any of a variety of data structures or other forms in policy control engine 85A, and may vary in the specific data or representation thereof from the details depicted in FIG. 5. Session policy table 105 may represent an abstract indication of policy setup module 103 detecting application flow changes and generating policy updates in response. Session policy table 105 includes a timestamp column, an application update column, and a policy update column. The timestamp column shows the year, month, day, hour, minute, and second that each change to an application flow is detected. The application update column shows changes in application flows as detected by DPI component 81 and as policy setup module 103 learns in changes to the application IDs supplied in DPI output 101. The policy update column shows each session policy update that policy setup module 103 generates in response to the application update in the same row 106. Each of the rows in session policy table 105 represent detection of, and response to, a change in the application flows in the subscriber session packet flow.

Row 105A represents the detection of a new session request to initiate a subscriber session from a subscriber device, and the session setup/update module responding by initially creating the new subscriber session for the subscriber device, such as a smartphone, for example. DPI component 81 provides the session information and the subscriber device IP address to the policy control engine. Policy setup module 103 responds by defining a session policy for the session that is tailored to the bandwidth, quality of service, and other properties indicated according to the service level agreement (SLA) associated with the subscriber device. Policy setup module 103 forwards this session policy to master subscriber session table 83. The session in the services module 8A now has the policy applied to it and the required bandwidth allocated for the session. Services module 8A then distributes this updated session information to the forwarding plane 10. This results in an associated session policy entry 84 being created on forwarding unit 72N, for example. Subsequent packets belonging to the subscriber session may be handled by forwarding unit 72N. Forwarding unit 72N uses session policy entry 84 to process the subscriber session packet flow between the subscriber device and a packet data network.

In row 106A, policy control engine 85A receives a first application flow for an Internet browser application in the subscriber session packet flow for the subscriber device. Forwarding plane 10 sends the initial packets from this new application flow to the services module 8A. This triggers the DPI component 81 of the services module 8A to send the application identifier for the new application along with the existing session information to the policy control engine 85A. Policy setup module 103 responds, at least in part, by updating the policy for the session by allotting bandwidth for the browser application flow to this subscriber session for the Internet browsing application in accordance with the subscriber's service level agreement. The policy control engine 85A applies this dynamic policy update to the existing session policy entry on the master session table 83 of the services module 8A. The policy update applies the required policy to handle the new application flow. The policy control engine 85 also updates the policy coordinator 91 with the modified session information. The services module 8A then distributes the modified session information to the session policy entry 84 on forwarding unit 72N.

Twelve seconds later, the subscriber opens a separate social networking application on the subscriber device as indicated in row 106B. Different options are possible under scenarios of modifying an existing session, for whether existing application flows need to be changed to accommodate new application flows being added to an existing subscriber session. In this case, no changes need to be made to existing application flows to accommodate the new application flows. Policy setup module 103 responds, at least in part, by updating the policy for the session by allotting bandwidth for the social networking application flow to this subscriber session, to accommodate the bandwidth required to direct the application flows for both the Internet browsing application and the social networking application in accordance with the subscriber's service level agreement. The policy control engine 85A applies this dynamic policy update to the existing session policy entry on the master session table 83 of the services module 8A. The policy update applies the required policy to handle the new application flow, while policies associated with existing application flow doesn't change, in this case. The policy control engine 85 again updates the policy coordinator 91 with the modified session information. The services module 8A then distributes the modified session information to the session policy entry 84 on forwarding unit 72N.

Soon the subscriber also opens a VoIP phone call over the subscriber device, initiating a third application flow in the session. Policy setup module 103 once again, in a similar manner, responds by updating the session policy to increase bandwidth and forwarding the updated policy downstream to packet forwarding engine 72N.

Thus, granular and dynamic policy control by policy control engine 85A manages network data traffic far more efficiently than if a single blanket session policy in accordance with the subscriber's service level agreement had to be applied for the entire session. Instead, policy control engine 85A continues updating the session policy in response to changes in the application flows, effectively providing individual application policies within the session policy. If the service level agreement is such that requires the subscriber device to be able to simultaneously maintain at least an Internet browser application, a social networking application, and a VoIP phone call with a minimum service level for ideal operation of all three applications, policy control engine 85A is able to fulfill the terms of that service level agreement with a lower overall service level, for example, than if highest level of service required (e.g., the service level for the VoIP phone call) had to be applied to every application flow for that subscriber device.

Later, in row 106D, DPI component 81 informs policy control engine 85A that the subscriber device has initiated a fourth simultaneous application in the form of a virtual private network (VPN) connection. Policy setup module 103 responds by allotting yet more bandwidth for the subscriber session to open the bandwidth needed for the VPN. However, policy setup module 103 also recognizes that the service level agreement for the subscriber device specifies a certain maximum total bandwidth, in this example, and that processing all four of these application data streams at their individual maximum bandwidth would exceed the maximum total bandwidth specified in the SLA. Policy setup module 103 therefore also re-balances the policies being applied to the various application data streams in the session to avoid exceeding the SLA maximum bandwidth. One way it may do this is by reducing the bandwidth allotted to each of the first three applications. In another example, however, policy rules 102 may specify that, in the case of bandwidth or other policy factors being constrained, VoIP phone calls should be given preference over an Internet browsing application, and VoIP phone calls and an Internet browsing application should both be given preference over a social networking application. Policy setup module 103 may therefore apply the application policies to the application flows in the subscriber session in a way that prioritizes between the application flows, based on factors such as the subscriber information, different policy rules applicable to each of the application flows, or an order in which each of the application flows was opened.

Policy setup module 103 may therefore craft its policy update in row 106D by cutting the social networking application to only occasional minimal bandwidth, downgrading the Internet browsing application to intermediate bandwidth, and modestly diminishing the bandwidth allotted for the VoIP phone call, thereby freeing up enough bandwidth to provide full bandwidth to the new VPN. In this example the policy rules 102 may also dictate that the most recently activated application be given the highest preference in bandwidth or other policy factors, and for instance always be allotted its maximum bandwidth in full. Policy setup module 103 may also implement various other compromises among other policy factors besides bandwidth and prioritizing the application data streams, such as quality of service (QoS), rate limiting, or offloading traffic to other network devices, for example, in balancing high application data stream loads that are constrained by the terms of the SLA and/or by general network traffic congestion from other subscriber sessions.

As an example of adjusting a session policy in response to network traffic congestion from other subscriber sessions, policy setup module 103 may monitor the total volume of packet data flows through services gateway 7A to detect a high volume of packet data traffic. If policy setup module 103 detects a high volume of packet data traffic in services gateway 7A, it may respond by applying an updated session policy, comprising updated application policies, to the application flows in a subscriber session. The updated application policies may have the general aim of limiting or reducing the resources applied to one or more application flows in one or more subscriber sessions, to optimize the total traffic processing among subscriber data packet flows, in view of the applicable service level agreements associated with the subscriber sessions.

For example, the updated application policies for a given subscriber session may include one or more of: limiting or reducing bandwidth for one or more of the application flows in the subscriber session; applying a rate limit to one or more of the application flows; limiting or reducing a quality of service to one or more of the application flows; or offloading traffic for the subscriber session to another network device. These updates to the application policies may be based on the application data flows and subscriber information of the subscriber session as well as the application data flows and subscriber information of the packet data traffic outside the subscriber session. For example, the policy setup module 103 may prioritize the application policies for a subscriber session with a more premium service level agreement above the application policies for a subscriber session with a lower service level agreement, and limit or reduce the resources dedicated to the application policies for subscriber sessions at the lower service level agreement. As services gateway 7A receives additional subscriber session packet flow for the subscriber session, it processes the application flows in this portion of the subscriber session packet flow in accordance with the application policies in the updated session policy.

In row 106E, DPI component 81 informs policy control engine 85A that the subscriber device is ending the VoIP call. Policy setup module 103 responds by redistributing bandwidth, priority, or other policy properties among the remaining three applications, which may include still applying rules to constrain one or more of the application flows to stay within the SLA maximum total bandwidth. In row 106F, the subscriber device closes the VPN, and policy setup module 103 again responds by rebalancing the bandwidth, and this time decreasing the total bandwidth for the session policy, with the remaining two applications well under the SLA total bandwidth. Similarly, policy setup module 103 continues dynamically and granularly updating the session policy as it adds new bandwidth for a new streaming video application in row 106G, removes bandwidth that had been allotted for the social networking application when that is closed in row 106H, and removes bandwidth that had been allotted for the streaming video application when that is closed in row 106J. After each of the modifications to the session policy in each of the rows 106, policy setup module 103 sends out the dynamic policy updates in session policy information 108 to master session table 83 and forwarding plane 10 (as depicted in FIG. 3), and in policy coordination output 109 to policy coordinator 91 (as depicted in FIG. 3).

Forwarding plane 10 informs the DPI component 81 of services module 8A, which in turn informs the policy control engine 85, as each individual application flow stops. The policy control engine 85 then clears the associated service information for that application flow from the session on the services module 8A. This session information is distributed by the services module 8A to the forwarding plane 10. In row 106K, the subscriber device closes the Internet browser, and the last application data stream in the policy is closed. The forwarding plane 10 informs the DPI component 81 which in turn informs the policy control engine 85 that the subscriber device has stopped generating all application flows that are part of the subscriber session. The policy control engine 85 clears the service information associated with the entire subscriber session on the services module 8A. It also sends an update to the policy coordinator 91 to delete the session information from the central repository 93. The services module 8A informs the forwarding plane 10 to delete the subscriber session policy entry 84.

Figure 6:
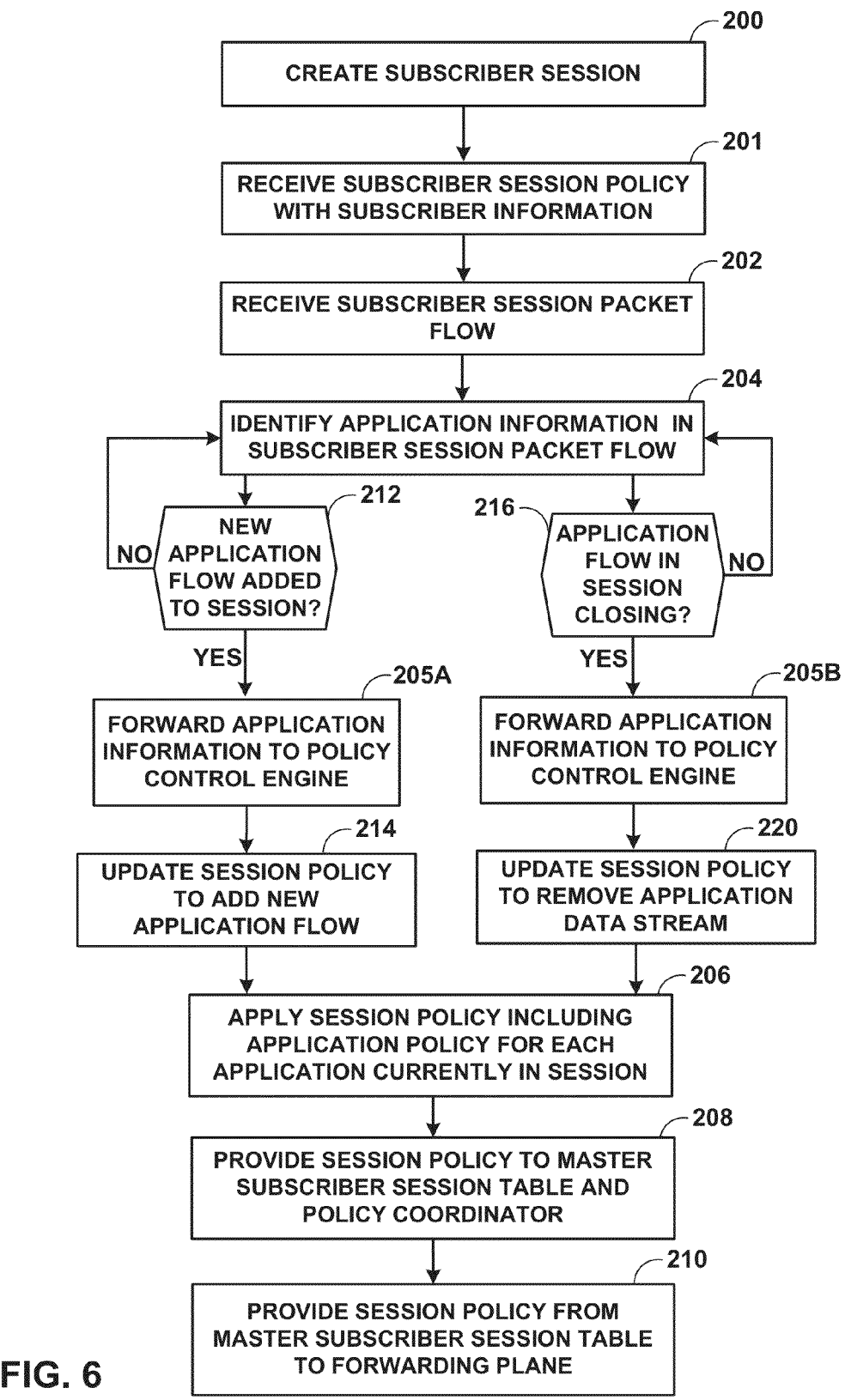
FIG. 6 is a flowchart illustrating an example mode of operation of one or more services modules of a network device in accordance with the techniques described herein.

FIG. 6 is a flowchart illustrating an example mode of operation of one or more services modules 8 of FIGS. 1 and 3, wherein the services module 8 includes policy control engines 85 of FIGS. 3 and 5 receiving information on the application flows of a subscriber session, creating and dynamically updating the session policy based on the subscriber information and the ongoing changes in the application flows of the individual applications in the session, and forwarding the updated session policy to a master subscriber session table and to a policy coordinator, in accordance with techniques for applying granular, dynamic, and virtualized session policy control for subscriber sessions as described herein.

Services module 8 creates a subscriber session (200) and receives a subscriber session policy (201) that includes general subscriber information relevant to the subscriber session as a whole, such as the service level agreement (SLA). This may include policy control engine 85 receiving the subscriber information. Services module 8 then receives a subscriber session packet flow (202), such as may be received through a forwarding unit 72. Deep packet inspection (DPI) component 81 of services module 8 identifies application identity information in the subscriber session packet flow (204), including identifying when a new application flow is added to the subscriber session (212) or when an existing application flow in the subscriber session is terminated (216). Whenever a new application flow is added to the session (YES branch of 212) or an existing application flow in the session is closed (YES branch of 216), DPI component 81 forwards the current application identity information to policy control engine 85 (205). As long as no new application flows are added to the session (NO branch of 212) and no existing application flows in the session are closed (NO branch of 216), DPI component 81 continues monitoring the subscriber session packet flow and inspecting the application flows therein (204).

Policy control engine 85 applies a session policy including individual application policies for each of the current application flows in the session, including any updates as application flows begin or end (206). Policy control engine 85 forwards the session policy, including any current updates, to master subscriber session table 83 and to policy coordinator 93 (208). The master subscriber session table 83 forwards the session policy to the forwarding plane 10 (210). The services module 8 continues monitoring the subscriber session packet flow, either as prompted by changes in the application flows, or at regular intervals, or in some other actively or passively monitoring system (204, 212, 216). If DPI component 81 detects a new application flow being added to the session (YES branch of 212), it forwards that information to the policy control engine 85 (205A), which updates the session policy as appropriate to accommodate the new application flow in the session policy (214). If DPI component 81 detects an existing application flow in the session being closed (YES branch of 216), it forwards that information to the policy control engine 85 (205B), which updates the session policy as appropriate to remove the closing application data flow from the session policy (220). (While decision blocks 212 and 216 are depicted in parallel in FIG. 6, this is only one particular example and they can also operate in serial or as a single integral monitoring function, for example.)

After the policy control engine 85 updates the session policy either to add a new application data flow (214) or to remove an application data flow (220), policy control engine 85 once again forwards the now-updated session policy to the master subscriber session table 83 and to the policy coordinator 91 (208). These functions may continue until the session is ended either from receipt of a close session request or because the session expires. The example of FIG. 6 may be modified or added to in a variety of other ways in other implementations.

Various embodiments of the present invention can be accomplished using hardware, software, or a combination of both hardware and software. The software used for various embodiments may be written in any programming language or combination of programming languages, and which may include C, C++, Java, PHP, Perl, JavaScript, Python, Ruby, Scala, Common Lisp, Clojure, or any other language. The software may make use of data structures, such as for a transcription data store or a flagged content data store, organized in any type of database and accessed with any type of data querying tools. Software for the user interface may be created using any programming language and/or any other tool. Software used for various embodiments may be stored on tangible computer-readable media comprising executable instructions for causing one or more programmable processors to perform any of the steps or functions described for any of the methods, systems, or devices as disclosed herein. For example, software used for various embodiments may be stored on one or more processor readable data storage media including hard disc drives, CD-ROMs, DVDs, optical disks, floppy disks, tape drives, RAM, ROM, or other suitable storage devices.

Different modules or other elements of software may be stored on any of various tangible computer-readable media anywhere in a communicating system, and may provide executable instructions to any programmable processor anywhere in a communicating system, in a way that cooperatively brings about the combined functions of various embodiments disclosed herein. In various embodiments, any or all of the steps or functions of a method or system may also be performed by dedicated hardware instead of or in addition to software, such as by custom integrated circuits, Application Specific Integrated Circuits (ASICs), Digital Signal Processors (DSPs), field-programmable gate arrays (FPGAs) or other gate arrays, complex programmable logic devices (CPLDs) or other programmable logic devices (PLDs), special purpose computers, or specialized network appliances, for example. The term "processor" or "processing circuitry" may generally refer to any of the foregoing logic circuitry, alone or in combination with other logic circuitry, or any other equivalent circuitry. A control unit comprising any type of hardware or any combination of hardware and software, may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

While a number of specific embodiments have been described, the scope of the invention is not limited to any particular embodiments or combination of embodiments or elements discussed above or depicted in the figures. These and other embodiments are within the scope of one or more of the following claims.

What is claimed is:

1. A method comprising:
   receiving, with a network device, a portion of a subscriber session packet flow for a subscriber session;
   reassembling application-layer data from data packets in the subscriber session packet flow into one or more application flows for the subscriber session;
   identifying, from the one or more application flows, application identity information for the one or more application flows;
   applying a first session policy to the subscriber session, wherein applying the first session policy comprises applying, by a first services module of the network device, one or more application policies to the one or more application flows in the subscriber session based on subscriber information and the application identity information for the one or more application flows; and
   processing the one or more application flows in the subscriber session for accessing a packet data network in accordance with the one or more application policies,
   providing the first session policy to a policy coordinator configured for a communicative connection with one or more additional services modules of the network device;
   receiving a second portion of the subscriber session packet flow with a second services module from among the one or more additional services modules;
   receiving, with the second services module, the first session policy from the policy coordinator; and
   processing the second portion of the subscriber session racket flow with the second services module in accordance with the first session policy as received with the second services module from the policy coordinator.

2. The method of claim 1, wherein applying the one or more application policies to the one or more application flows in the subscriber session comprises at least one of: allocating total bandwidth for the subscriber session based on the subscriber information and the application identity information for the one or more application flows; allocating bandwidth for one of the application flows based on the subscriber information and the application identity information for the one of the application flows and for any other application flows in the subscriber session; applying a rate limit to one of the application flows based on the subscriber information and the application identity information for the one of the application flows; applying a quality of service to one of the application flows based on the subscriber information and the one or more application flows; or offloading traffic for the subscriber session based on the subscriber information and the application identity information for the one or more application flows.

3. The method of claim 1, further comprising:
monitoring the application flows in the subscriber session to identify deactivation of one of the application flows or activation of a new application flow for the subscriber session;
applying an updated session policy, comprising updated application policies, to the application flows in the subscriber session in response to the deactivation of one of the application flows or the activation of the new application flow;
receiving, with the network device, a subsequent portion of the subscriber session packet flow for the subscriber session; and
processing the application flows in the subsequent portion of the subscriber session packet flow in accordance with the application policies in the updated session policy.

4. The method of claim 3, wherein applying the updated session policy to the application flows in the subscriber session comprises at least one of: increasing or decreasing total allocated bandwidth for the subscriber session, increasing or decreasing allocated bandwidth for one of the application flows, applying a rate limit, defining a quality of service, or offloading traffic, based on the subscriber information and the deactivation of one of the application flows or the activation of the new application flow.

5. The method of claim 1, further comprising:
monitoring a total volume of packet data flows through the network device to detect a high volume of packet data traffic;
responding to detecting a high volume of packet data traffic by applying an updated session policy, comprising updated application policies, to the application flows in the subscriber session, wherein the updated session policy comprises one or more of: limiting or reducing bandwidth for one or more of the application flows, applying a rate limit to one or more of the application flows, limiting or reducing a quality of service for one or more of the application flows, or offloading traffic for the subscriber session, based on the subscriber information of the subscriber session and the application identity information for the application data flows of the subscriber session, and based on application identity information for the application data flows and subscriber information of the packet data traffic outside the subscriber session;
receiving, with the network device, a subsequent portion of the subscriber session packet flow for the subscriber session; and
processing the application flows in the subsequent portion of the subscriber session packet flow in accordance with the application policies in the updated session policy.

6. The method of claim 1, wherein the second services module is on the network device.

7. The method of claim 1, wherein the network device is a first network device, the method further comprising:
receiving a third portion of the subscriber session packet flow with a third services module on a second network device;
receiving, with the third services module, the first session policy from the policy coordinator; and
processing the third portion of the subscriber session packet flow with the third services module in accordance with the first session policy as received with the third services module from the policy coordinator.

8. The method of claim 1, further comprising:
applying, with the first services module, an updated session policy comprising updated application policies to the application flows in the subscriber session based on deactivation of one of the application flows or activation of a new application flow; and
providing the updated session policy to the policy coordinator.

9. The method of claim 8, further comprising:
receiving, with the second services module, the updated session policy from the policy coordinator; and
processing the application flows in the second portion of the subscriber session packet flow with the second services module in accordance with the application policies in the updated session policy as received from the policy coordinator.

10. The method of claim 8, wherein the updated session policy is provided to the policy coordinator after a preselected interval.

11. The method of claim 8, wherein the updated session policy is provided to the policy coordinator after the deactivation of one of the application flows or activation of the new application flow is identified.

12. The method of claim 1, wherein the first session policy comprises a first allocated bandwidth for the subscriber session based on the subscriber information and the application identity information for the one or more application flows, the method further comprising:
identifying a new application flow for a new application in the subscriber session; and
applying an updated session policy to the subscriber session, wherein the updated session policy comprises allocating bandwidth for the new application flow.

13. The method of claim 12, wherein the subscriber information comprises a subscriber maximum bandwidth, and if the bandwidth allocated for the new application flow and the first allocated bandwidth are greater than the subscriber maximum bandwidth, then applying the updated session policy further comprises reducing the bandwidth allocated to at least one of the application flows in the first session policy.

14. The method of claim 1, wherein the first session policy comprises a first allocated bandwidth based on the one or more application flows, the method further comprising:
identifying at least one of the application flows in the first session policy being closed; and
applying an updated session policy to the session, wherein the updated session policy removes bandwidth allocated for the at least one of the application flows in the first session policy that is closed.

15. The method of claim 1, wherein the network device is a gateway, and wherein identifying the subscriber information and the application identity information for the subscriber session, and applying the first session policy to the subscriber session, are performed by the gateway.

16. The method of claim 1, wherein the network device is a gateway, and wherein identifying the subscriber information and the application identity information for the subscriber session, and applying the first session policy to the subscriber session, are performed by a virtual control plane.

17. The method of claim 1, wherein applying the application policies to the application flows in the subscriber session comprises prioritizing between the application flows, based on one or more of: the subscriber information, policy rules applicable to each of the application flows, or an order in which each of the application flows was opened.

18. A network device comprising:
a first services module; and
a routing engine that includes a policy coordinator component,
wherein the first services module comprises:
  a deep packet inspection component;
  a policy control engine, with a communicative connection with the routing engine; and
  a master subscriber session table;
wherein the deep packet inspection component is configured to: receive a portion of a subscriber session packet flow for a subscriber session; reassemble application-layer data from data packets in the subscriber session packet flow into one or more application flows for the subscriber session; notify the policy control engine of subscriber information and application identity information for the one or more application flows; and notify the policy control engine of a deactivation of one of the application flows or an activation of a new application flow in the subscriber session;
wherein the policy control engine is configured to: apply a first session policy, comprising an application policy for the one or more application flows, to the subscriber session based at least in part on the subscriber information and the application identity information for the one or more application flows; provide the first session policy to the master subscriber session table and to the policy coordinator component; apply an updated session policy to the subscriber session based at least in part on the deactivation of one of the application flows or the activation of the new application flow; provide the updated session policy to the master subscriber session table and to the policy coordinator component; and receive a different updated session policy from the policy coordinator component; and
wherein the first services module is configured to provide the first session policy and the updated session policy from the master subscriber session table to a forwarding unit configured to process at least a portion of the subscriber session packet flow for accessing a packet data network in accordance with the one or more application policies in the first session policy or the updated session policy.

19. The network device of claim 18, wherein the network device is a gateway router, and the first services module has a communicative connection with at least one forwarding component comprised in the gateway router.

20. The network device of claim 18, wherein the network device is a virtual control plane comprised in a control device, and the first services module has a communicative connection with at least one forwarding component comprised in a gateway router.

21. The network device of claim 18, wherein the policy control engine is further configured such that applying the first session policy to the subscriber session comprises at least one of: allocating total bandwidth for the subscriber session based on the subscriber information and the application identity information for the one or more application flows; allocating bandwidth for one of the application flows based on the subscriber information and the application identity information for the one of the application flows and for any other application flows in the subscriber session; applying a rate limit to one of the application flows based on the subscriber information and the application identity information for the one of the application flows; applying a quality of service to one of the application flows based on the subscriber information and the one or more application flows; or offloading traffic for the subscriber session based on the subscriber information and the application identity information for the one or more application flows.

22. The network device of claim 18, wherein the policy control engine is further configured such that applying the updated session policy to the subscriber session based at least in part on the deactivation of one of the application flows comprises at least one of: de-allocating bandwidth for the one of the application flows that is deactivated; decreasing total allocated bandwidth for the subscriber session; increasing allocated bandwidth for one of the application flows that is not deactivated; increasing a priority of one of the application flows that is not deactivated; increasing a quality of service of one of the application flows that is not deactivated; or ending the subscriber session.

23. The network device of claim 18, wherein the policy control engine is further configured such that applying the updated session policy to the subscriber session based at least in part on the activation of one of the application flows comprises at least one of: allocating bandwidth for the one of the application flows that is activated; increasing total allocated bandwidth for the subscriber session; decreasing allocated bandwidth for one of the application flows that was already activated; decreasing a priority of one of the application flows that was already activated; or increasing a quality of service of one of the application flows that was already activated.

24. The network device of claim 18, further comprising a second services module, wherein the second services module comprises:
a second deep packet inspection component;
a second policy control engine, with a communicative connection with the routing engine; and
a second master subscriber session table;
wherein the second deep packet inspection component is configured to notify the second policy control engine if the second deep packet inspection component receives a second portion of the subscriber session packet flow; and
wherein the second policy control engine is configured to query the policy coordinator component for a current session policy for the subscriber session, and to apply a current session policy received from the policy coordinator component to the subscriber session for the second portion of the subscriber session packet flow, wherein the current session policy comprises an application policy for one or more current application flows.

25. A control device comprising:
a policy coordinator, the policy coordinator comprising a policy information and session state repository, wherein the control device is configured to:
receive a series of session policies for a subscriber session packet flow from a first policy control engine of a first services module in a first gateway router, the series of session policies comprising an initial session policy and one or more updated session policies based on updated application packet flows within the subscriber session packet flow, the one or more updated session policies comprising a current session policy;

receive a query for the current session policy for the subscriber session packet flow from a second policy control engine of a second services module in a second gateway router; and communicate the current session policy for the subscriber session packet flow from the policy coordinator comprised in the control device to the second policy control engine of the second services module in the second gateway router.

26. The control device of claim 25, wherein communicating the current session policy for the subscriber session packet flow comprises identifying one or more application flows in the subscriber session packet flow, and communicating policy information on one or more of: total allocated bandwidth for the subscriber session; allocated bandwidth for each of one or more of the application flows; priority each of one or more of the application flows; and quality of service of each of one or more of the application flows.

* * * * *